US008116449B2

(12) United States Patent  (10) Patent No.: US 8,116,449 B2
Bodo et al.  (45) Date of Patent: *Feb. 14, 2012

(54) COST-EFFECTIVE, MULTICHANNEL DIGITAL LOGGER

(75) Inventors: Martin J. Bodo, Los Altos Hills, CA (US); Robert A. Rosenbloom, Santa Cruz, CA (US)

(73) Assignee: Computer Performance, Inc., Santa Clara, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 12/386,070

(22) Filed: Apr. 13, 2009

(65) Prior Publication Data

US 2009/0285368 A1 Nov. 19, 2009

Related U.S. Application Data

(63) Continuation of application No. 10/827,005, filed on Apr. 19, 2004, now Pat. No. 7,539,301.

(51) Int. Cl.
*H04M 1/76* (2006.01)

(52) U.S. Cl. ............... 379/414; 379/90.01; 379/207.02; 379/219; 369/59.1; 369/53.16; 369/53.31

(58) Field of Classification Search ............... 379/219, 379/207.02, 88.2, 51, 93.02; 370/468, 485, 370/489, 503; 704/200
See application file for complete search history.

(56) References Cited

U.S. PATENT DOCUMENTS

| | | | |
|---|---|---|---|
| 4,549,047 A | 10/1985 | Brian et al. | |
| 4,891,835 A | 1/1990 | Leung et al. | |
| 5,153,905 A | 10/1992 | Bergeron et al. | |
| 5,274,738 A * | 12/1993 | Daly et al. | 704/200 |
| 5,339,203 A | 8/1994 | Henits et al. | |
| 5,396,371 A * | 3/1995 | Henits et al. | 360/5 |
| 5,404,455 A | 4/1995 | Daly et al. | |
| 5,446,603 A | 8/1995 | Henits et al. | |
| 5,448,420 A | 9/1995 | Henits et al. | |
| 5,457,782 A | 10/1995 | Daly et al. | |
| 5,524,261 A | 6/1996 | Daly et al. | |
| 5,526,406 A * | 6/1996 | Luneau | 455/563 |
| 5,598,391 A | 1/1997 | Mukawa | |
| 5,625,890 A | 4/1997 | Swift | |
| 5,710,978 A | 1/1998 | Swift | |
| 5,819,005 A * | 10/1998 | Daly et al. | 704/200 |
| 6,021,129 A | 2/2000 | Martin et al. | |

(Continued)

FOREIGN PATENT DOCUMENTS

JP 11-238301 8/1999

*Primary Examiner* — Joseph J Nguyen
(74) *Attorney, Agent, or Firm* — Donald E. Schreiber

(57) ABSTRACT

A digital logger system includes a multichannel interface circuit that:
1. concurrently and continuously-receives audio telecommunication signals for at least two telephone calls from a digital hybrid telephone line; and
2. continuously transmits linearly encoded digital audio data representing the received audio signals.

A Universal Serial Bus ("USB") hub of the system receives the transmitted digital data for retransmission to a USB root hub. A USB root hub of personal computer ("PC") receives transmitted digital data, and executes PC software which continuously monitors the digital data for embedded line status and signaling information including a telephone line "going off hook." When a telephone line goes "off hook," the software records both:
1. an audio header that stores information about a telephone call; and
2. an audio file that stores compressed digital data for the telephone call. Jul. 2, 2009.

12 Claims, 5 Drawing Sheets

U.S. PATENT DOCUMENTS

| | | | |
|---|---|---|---|
| 6,038,199 A | 3/2000 | Pawlowski et al. | |
| 6,122,239 A * | 9/2000 | Bodo et al. | 711/111 |
| 6,473,438 B1 * | 10/2002 | Cioffi et al. | 370/468 |
| 6,571,211 B1 | 5/2003 | Dwyer et al. | |
| 6,658,499 B1 | 12/2003 | Day et al. | |
| 6,751,315 B1 | 6/2004 | Liu et al. | |
| 6,775,372 B1 * | 8/2004 | Henits | 379/219 |
| 6,781,957 B2 | 8/2004 | Haislett | |
| 6,865,687 B1 | 3/2005 | Ichimi | |
| 6,870,920 B2 * | 3/2005 | Henits | 379/207.02 |
| 6,985,492 B1 | 1/2006 | Thi et al. | |
| 7,154,865 B1 | 12/2006 | Fulcomer et al. | |

* cited by examiner

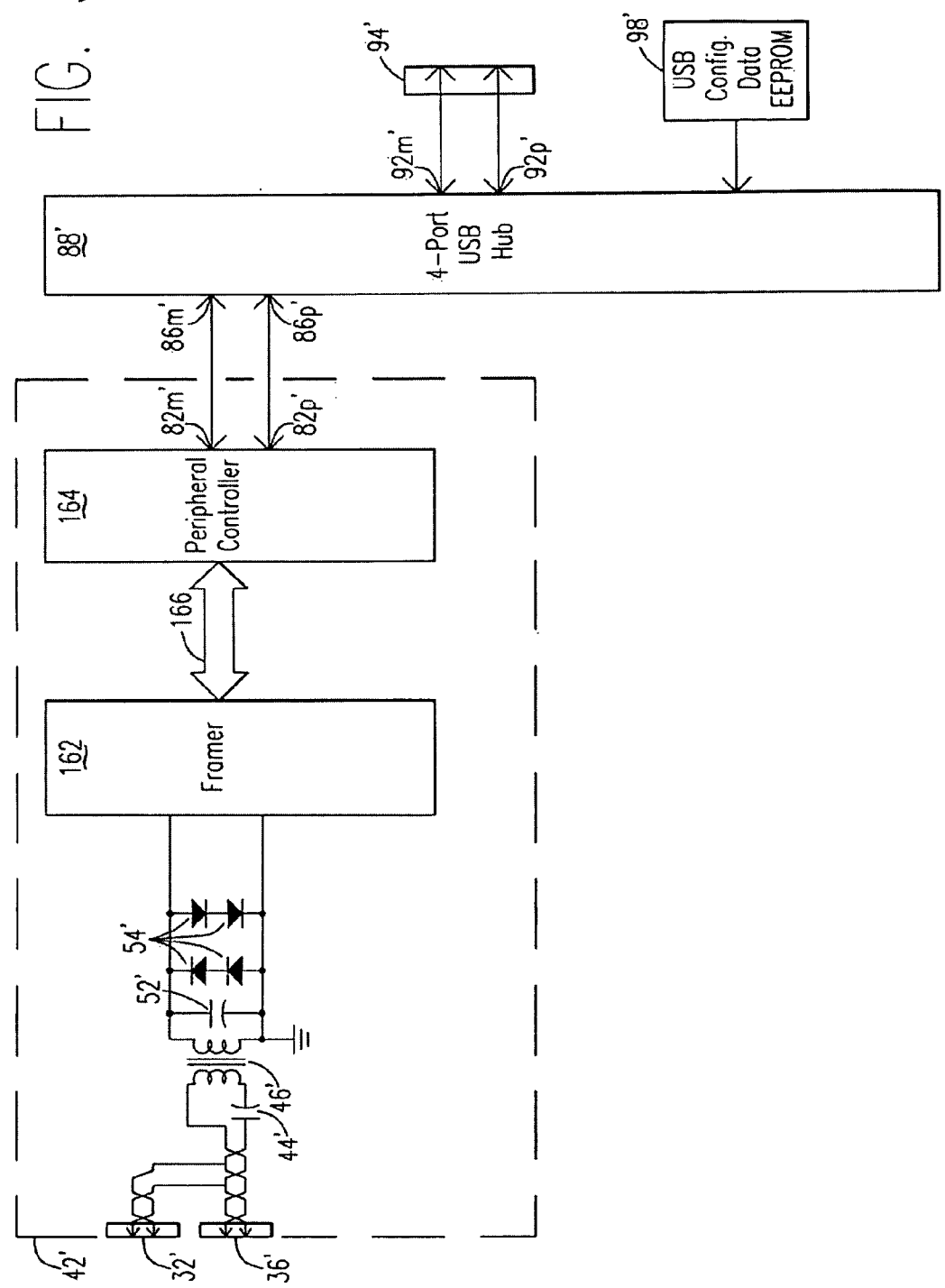

COST-EFFECTIVE, MULTICHANNEL DIGITAL LOGGER

This application is a continuation of U.S. patent application Ser. No. 10/827,005 filed Apr. 19, 2004 now U.S. Pat. No. 7,539,301.

COMPACT DISK APPENDIX

Appendix I hereto, comprising a pair of identical compact disks ("CD-Rs") included in U.S. patent application Ser. No. 10/827,005 when filed Apr. 19, 2004, is hereby incorporated by reference. The pair of identical compact disks included U.S. patent application Ser. No. 10/827,005 when filed Apr. 19, 2004, have the following characteristics.

Machine Format: IBM-PC
Operating System Compatibility: MS-Windows NT 4.0

| File Name | Size | Creation Date |
|---|---|---|
| List of files for directory \Digital_Logger\Call Analyzer Source Code | | |
| AddressDlg.cpp | 9,001 | 07/01/03 08:07p |
| AddressDlg.h | 1,837 | 04/12/00 07:09p |
| AddressesDlg.cpp | 4,464 | 09/25/03 08:14a |
| AddressesDlg.h | 1,849 | 09/25/03 08:13a |
| AdvancedPropsDlg.cpp | 4,344 | 07/01/03 08:16p |
| AdvancedPropsDlg.h | 1,669 | 07/16/01 09:55p |
| AnalyzeDlg.cpp | 2,522 | 10/21/03 09:13p |
| AnalyzeDlg.h | 1,356 | 10/21/03 09:13p |
| AnalyzeNewFileThread.cpp | 4,633 | 08/21/03 11:13a |
| AnalyzeNewFileThread.h | 1,495 | 07/01/03 08:07p |
| appendoptions.cpp | 4,233 | 11/08/03 09:32p |
| appendoptions.h | 1,388 | 01/28/04 08:08a |
| AreaCodeRecordset.cpp | 2,843 | 02/14/01 03:29a |
| AreaCodeRecordset.h | 1,401 | 03/09/00 03:40a |
| AUPlayer.cpp | 6,870 | 07/01/03 08:16p |
| AUPlayer.h | 1,642 | 12/25/02 10:12p |
| Autorun.inf | 43 | 05/25/00 04:46p |
| BusinessDBDoc.h | 0 | 02/11/01 06:01p |
| calendar.cpp | 9,225 | 04/03/00 10:34p |
| calendar.h | 3,457 | 02/09/99 05:29a |
| CaliforniaBusinessDBSet.cpp | 3,026 | 01/21/01 07:07p |
| CaliforniaBusinessDBSet.h | 1,944 | 01/21/01 07:11p |
| CallList.cpp | 4,544 | 08/07/03 10:07a |
| CallList.h | 2,038 | 08/08/03 03:38p |
| CASAnalysisParams.cpp | 783 | 07/01/03 08:20p |
| CASAnalysisParams.h | 1,113 | 11/14/01 01:19p |
| CASOSPropPage.cpp | 8,142 | 08/07/03 10:10a |
| CASOSPropPage.h | 1,668 | 08/07/03 10:18a |
| CASOSRecordset.cpp | 3,371 | 07/01/03 08:20p |
| CASOSRecordset.h | 1,661 | 04/29/02 06:00a |
| CatalogFilterDlg.cpp | 2,980 | 07/01/03 08:07p |
| CatalogFilterDlg.h | 1,656 | 11/14/01 02:25a |
| cid.c | 19,095 | 12/30/02 07:16a |
| DatabasePropPage.cpp | 5,753 | 11/06/03 11:52p |
| DatabasePropPage.h | 1,684 | 11/04/03 11:01p |
| DDC.H | 1,547 | 10/18/94 02:09p |
| DDCMATH.H | 407 | 04/25/00 10:36p |
| DialingRulesPropPage.cpp | 3,370 | 07/01/03 08:26p |
| DialingRulesPropPage.h | 1,787 | 07/01/03 08:20p |
| Dib.cpp | 19,212 | 07/29/03 09:45p |
| Dib.h | 2,384 | 07/29/03 09:38p |
| Directories.cpp | 5,548 | 04/22/02 01:01p |
| DisplayFilterDlg.cpp | 14,055 | 08/11/03 12:27a |
| DisplayFilterDlg.h | 1,895 | 08/07/03 10:19a |
| DisplayPropPage.cpp | 11,810 | 10/26/03 08:47p |
| DisplayPropPage.h | 1,952 | 07/01/03 08:07p |
| DLIHeaderEditDlg.cpp | 14,068 | 09/16/03 08:18p |
| DLIHeaderEditDlg.h | 2,859 | 08/07/03 11:21a |
| DLIHeaderEditForm.cpp | 3,775 | 02/05/03 01:23p |
| DLIHeaderEditForm.h | 1,961 | 08/07/03 10:10a |
| dlilookup.cpp | 1,478 | 12/14/01 05:30p |
| dlilookup.h | 1,850 | 12/14/01 05:30p |

-continued

Machine Format: IBM-PC
Operating System Compatibility: MS-Windows NT 4.0

| File Name | Size | Creation Date |
|---|---|---|
| DLILookup.tlh | 2,497 | 11/15/01 04:49p |
| DLILookup.tli | 629 | 11/15/01 04:49p |
| DLLC.tlh | 2,553 | 04/10/02 07:11p |
| DLLC.tli | 1,149 | 04/10/02 07:11p |
| DLLCd.tlh | 2,554 | 04/10/02 08:35a |
| DLLCd.tli | 1,149 | 04/10/02 08:35a |
| dtpicker.cpp | 9,701 | 02/09/99 04:18a |
| dtpicker.h | 3,600 | 02/09/99 04:18a |
| EBTreeListCtrl.cpp | 3,632 | 08/31/03 10:22a |
| EBTreeListCtrl.h | 1,203 | 08/31/03 10:21a |
| EndBtn.cpp | 2,509 | 07/01/03 08:07p |
| EndBtn.h | 1,264 | 12/28/99 02:10a |
| EQView.cpp | 1,723 | 07/01/03 08:07p |
| EQView.h | 1,587 | 01/09/00 04:05p |
| EvidenceBuilder.clw | 39,852 | 02/24/04 11:51a |
| EvidenceBuilder.cpp | 17,079 | 11/04/03 11:04p |
| EvidenceBuilder.dsp | 18,097 | 02/17/04 07:06a |
| EvidenceBuilder.dsw | 553 | 07/01/03 08:04p |
| EvidenceBuilder.h | 1,749 | 09/22/03 12:44p |
| EvidenceBuilder.plg | 8,411 | 03/17/04 11:06p |
| EvidenceBuilder.rc | 101,300 | 02/24/04 11:51a |
| EvidenceBuilderdoc.cpp | 142,485 | 10/28/03 10:10p |
| EvidenceBuilderDoc.h | 15,128 | 10/27/03 08:57p |
| EvidenceBuilderView.cpp | 259,732 | 03/17/04 11:37p |
| EvidenceBuilderView.h | 15,325 | 03/02/04 01:40p |
| Fftmisc.cpp | 1,964 | 12/27/99 05:08p |
| FilterDlg.cpp | 13,179 | 07/01/03 08:00p |
| font.cpp | 2,098 | 02/09/99 05:29a |
| font.h | 1,042 | 02/09/99 05:29a |
| FontPropertyPage.cpp | 12,380 | 07/01/03 08:26p |
| FontPropertyPage.h | 2,017 | 07/01/03 08:22p |
| FontPropPage.cpp | 1,139 | 06/28/00 04:36p |
| FontPropPage.h | 1,369 | 06/28/00 04:36p |
| FOURIER.H | 2,892 | 06/26/00 05:29p |
| Fourierd.cpp | 9,183 | 06/26/00 05:28p |
| Globals.cpp | 22,344 | 11/04/03 10:57p |
| Globals.h | 10,137 | 11/04/03 11:04p |
| HelpDoc.cpp | 1,363 | 07/01/03 08:00p |
| HelpDoc.h | 1,361 | 07/10/00 01:37p |
| HelpFrame.cpp | 3,146 | 09/01/03 12:57p |
| HelpFrame.h | 1,458 | 09/01/03 12:57p |
| HelpView.cpp | 4,737 | 07/01/03 08:00p |
| HelpView.h | 2,359 | 02/09/99 03:48a |
| InternicPropPage.cpp | 8,368 | 03/03/04 11:10p |
| InternicPropPage.h | 1,952 | 08/07/03 11:21a |
| InternicRecordset.cpp | 2,971 | 07/01/03 08:00p |
| InternicRecordset.h | 1,553 | 02/12/01 07:11p |
| LineCalculator.cpp | 3,230 | 10/28/03 10:10p |
| LineCalculator.h | 1,286 | 10/27/03 08:55p |
| ListViewFrame.cpp | 4,253 | 09/01/03 07:13a |
| ListViewFrame.h | 2,155 | 08/07/03 11:31a |
| MainFrm.cpp | 14,340 | 10/01/03 11:33a |
| MainFrm.h | 2,150 | 09/22/03 01:00p |
| MakeHelp.bat | 1,408 | 12/17/99 02:56a |
| MIL_DTMF.dat | 129 | 07/01/03 09:36a |
| MIL2400ConfigDlg.cpp | 29,187 | 07/01/03 08:00p |
| MIL2400ConfigDlg.h | 3,558 | 05/12/03 05:20a |
| MILAddressPropPage.cpp | 10,588 | 08/08/03 09:23p |
| MILAddressPropPage.h | 2,022 | 08/07/03 10:31a |
| MILAddressRecordset.cpp | 4,211 | 09/18/03 12:48p |
| MILAddressRecordset.h | 1,690 | 02/11/01 05:59p |
| MILCatalogingException.cpp | 901 | 07/01/03 08:00p |
| MILCatalogingException.h | 1,070 | 10/22/01 02:40a |
| MILStringArray.h | 606 | 12/27/99 05:32a |
| ModelessErrorMsgDlg.h | 1,366 | 11/08/01 06:36p |
| ModelessErrorMsgDlg.cpp | 1,528 | 08/23/00 03:26a |
| MVC3AE.tmp | 12,368 | 02/14/01 03:36p |
| NewFileMonitorThread.h | 1,879 | 07/01/03 08:00p |
| NewFileMonitorThread.cpp | 11,245 | 08/29/03 11:51a |
| NotesSearchParamsDlg.h | 1,314 | 12/12/02 05:10p |
| NotesSearchParamsDlg.cpp | 2,675 | 08/08/03 03:34p |
| ODButton.cpp | 19,800 | 07/17/01 04:35p |
| ODButton.h | 4,036 | 07/17/01 04:14p |
| paul_cid.dsp | 4,300 | 04/18/00 10:45p |
| PauseBtn.cpp | 2,447 | 07/01/03 08:00p |

-continued

Machine Format: IBM-PC
Operating System Compatibility: MS-Windows NT 4.0

| File Name | Size | Creation Date |
|---|---|---|
| PauseBtn.h | 1,279 | 12/28/99 02:10a |
| picture.cpp | 1,128 | 02/09/99 04:18a |
| picture.h | 1,295 | 02/09/99 04:18a |
| PlayBtn.cpp | 2,283 | 07/01/03 08:00p |
| PlayBtn.h | 1,271 | 12/28/99 02:10a |
| PlayBuffer.cpp | 1,988 | 07/01/03 08:00p |
| PlayBuffer.h | 748 | 12/25/02 09:43p |
| PlayPosSlider.cpp | 1,117 | 07/01/03 08:00p |
| PlayPosSlider.h | 1,274 | 12/28/99 10:07p |
| PreFilterDlg.cpp | 27,524 | 10/09/03 03:19p |
| PreFilterDlg.h | 2,747 | 09/24/03 08:54p |
| prefix.csv | 2,904,046 | 07/10/03 12:37p |
| prefix1.csv | 370,875 | 05/08/00 08:45p |
| PrefixRecordset.cpp | 3,649 | 07/01/03 08:00p |
| PrefixRecordset.h | 1,397 | 07/21/03 04:48p |
| PrefsDlg.cpp | 11,405 | 07/01/03 08:22p |
| PrefsDlg.h | 1,829 | 07/01/03 08:00p |
| PrefsPropSheet.cpp | 2,784 | 07/01/03 08:00p |
| PrefsPropSheet.h | 1,928 | 07/01/03 08:00p |
| PrintColHdr.cpp | 1,191 | 07/01/03 08:00p |
| PrintColHdr.h | 1,236 | 06/08/02 05:10p |
| RCa00772 | 132,904 | 02/14/01 06:02p |
| RCa77983 | 123,298 | 07/11/00 06:09p |
| ReadMe.txt | 14,476 | 12/23/02 08:48a |
| RecordingListView.cpp | 6,255 | 09/23/03 10:47a |
| RecordingListView.h | 2,464 | 08/07/03 11:30a |
| resource.h | 21,012 | 11/06/03 11:44p |
| SaveVersionDlg.cpp | 2,133 | 07/01/03 08:00p |
| SaveVersionDlg.h | 1,649 | 07/04/00 03:16a |
| SelectDriveDlg.cpp | 2,404 | 07/01/03 08:00p |
| SelectDriveDlg.h | 1,395 | 10/25/01 10:42p |
| SelectFolderDlg.cpp | 1,301 | 07/01/03 08:00p |
| SelectFolderDlg.h | 1,291 | 04/03/00 10:34p |
| SelectFolderNameDlg.cpp | 1,521 | 07/28/03 09:37a |
| SelectFolderNameDlg.h | 1,381 | 10/26/01 03:55p |
| SelectSearchedCallsDlg.cpp | 11,321 | 10/02/03 09:47p |
| SelectSearchedCallsDlg.h | 1,823 | 10/02/03 09:34p |
| SetUserFieldsDlg.cpp | 2,468 | 07/01/03 08:00p |
| SetUserFieldsDlg.h | 1,337 | 04/12/00 07:09p |
| Splash.cpp | 3,228 | 07/11/00 04:18p |
| Splash.h | 1,159 | 06/26/00 06:50p |
| StartBtn.cpp | 2,535 | 07/01/03 08:00p |
| StartBtn.h | 1,279 | 12/28/99 02:10a |
| StdAfx.cpp | 376 | 07/28/03 09:33a |
| StdAfx.h | 3,606 | 10/25/03 08:46p |
| StepBackBtn.cpp | 2,559 | 07/01/03 08:00p |
| StepBackBtn.h | 1,309 | 12/29/99 12:22a |
| StepFwdBtn.cpp | 2,546 | 07/01/03 08:00p |
| StepFwdBtn.h | 1,299 | 12/29/99 12:22a |
| StopBtn.cpp | 2,511 | 07/01/03 08:00p |
| StopBtn.h | 1,271 | 12/28/99 02:10a |
| ToEndBtn.cpp | 2,535 | 07/01/03 08:00p |
| ToEndBtn.h | 1,246 | 04/29/02 06:27a |
| TraceDlg.cpp | 996 | 07/01/03 08:00p |
| TraceDlg.h | 1,297 | 10/31/01 03:58a |
| WaveformWnd.cpp | 702 | 10/23/03 08:09p |
| WaveformWnd.h | 1,167 | 10/23/03 08:23p |
| WBlinds.h | 13,588 | 06/07/03 10:38a |
| xTurboDLL.h | 1,113 | 08/31/03 10:26a |

List of files for directory
\Digital_Logger\Call Analyzer Source Code\Help

| File Name | Size | Creation Date |
|---|---|---|
| address_lookup.htm | 3,207 | 05/17/02 06:46a |
| catalog_hard_drive.htm | 3,312 | 06/26/03 06:49a |
| config_MIL-2400.htm | 9,226 | 06/26/03 06:42a |
| copyCD.htm | 2,078 | 04/20/03 03:45a |
| filter_calls.htm | 3,403 | 07/14/00 11:40p |
| getting_started.htm | 8,924 | 06/26/03 06:49a |
| help_start.htm | 5,662 | 06/26/03 06:42a |
| index.htm | 812 | 04/20/01 04:14a |
| notes_searching.htm | 3,699 | 06/11/03 01:53p |
| page_header.htm | 1,987 | 06/26/03 06:49a |
| play_call.htm | 5,099 | 05/16/02 09:25p |
| prefs.htm | 6,787 | 06/26/03 06:55a |
| printing.htm | 5,978 | 05/17/02 06:42a |

-continued

Machine Format: IBM-PC
Operating System Compatibility: MS-Windows NT 4.0

| File Name | Size | Creation Date |
|---|---|---|
| rollover.js | 974 | 04/30/00 10:02p |
| send_files.htm | 4,687 | 05/17/02 06:35a |
| sort_calls.htm | 2,094 | 11/20/01 02:28p |
| troubleshooting.htm | 8,291 | 06/26/03 06:55a |

List of files for directory
\Digital_Logger\Call Analyzer Source Code\
TurboDLL_src\TurboDLL

| File Name | Size | Creation Date |
|---|---|---|
| Affine.cpp | 5,161 | 05/10/00 09:43p |
| Affine.h | 3,011 | 05/10/00 10:31p |
| BitmapInfo.cpp | 4,389 | 05/10/00 10:06p |
| BitmapInfo.h | 1,475 | 05/10/00 10:31p |
| Color.cpp | 2,916 | 05/10/00 10:06p |
| Color.h | 2,776 | 05/10/00 10:31p |
| Dib.cpp | 28,298 | 11/04/03 10:31p |
| Dib.h | 6,451 | 05/11/00 10:03p |
| dTurboDLL.def | 193 | 08/31/03 12:43p |
| filedialog.cpp | 3,098 | 05/10/00 10:06p |
| filedialog.h | 1,486 | 05/10/00 10:31p |
| ReadMe.txt | 310 | 09/20/02 10:23p |
| resource.h | 1,242 | 11/04/03 10:30p |
| StdAfx.cpp | 210 | 12/05/01 05:19p |
| StdAfx.h | 1,470 | 01/07/02 10:53a |
| TLCDragWnd.cpp | 28,970 | 07/15/02 10:56p |
| TLCDragWnd.h | 2,402 | 03/17/02 03:52p |
| TLCDropWnd.cpp | 3,786 | 07/15/02 10:59p |
| TLCDropWnd.h | 1,527 | 02/07/02 09:48p |
| TLHDragWnd.cpp | 7,887 | 07/15/02 10:58p |
| TLHDragWnd.h | 1,676 | 02/20/02 10:52a |
| TLHDropWnd.cpp | 4,491 | 07/15/02 10:59p |
| TLHDropWnd.h | 1,683 | 12/28/01 08:33p |
| TreeListColumnInfo.cpp | 4,478 | 02/01/02 11:50p |
| TreeListColumnInfo.h | 4,462 | 02/01/02 11:49p |
| TreeListComboCtrl.cpp | 1,262 | 02/01/02 11:39p |
| TreeListComboCtrl.h | 1,308 | 02/01/02 02:45a |
| TreeListCtrl.cpp | 152,495 | 12/03/03 11:06p |
| TreeListCtrl.h | 26,539 | 11/23/03 08:42p |
| TreeListDC.cpp | 1,361 | 12/31/01 05:18p |
| TreeListDC.h | 835 | 09/19/02 08:49p |
| TreeListEditCtrl.cpp | 1,269 | 02/01/02 11:39p |
| TreeListEditCtrl.h | 1,326 | 01/31/02 02:44p |
| TreeListHeaderCtrl.cpp | 31,035 | 11/23/03 09:22p |
| TreeListHeaderCtrl.h | 4,502 | 09/19/02 08:49p |
| TreeListItem.cpp | 4,948 | 03/19/02 07:48p |
| TreeListItem.h | 2,922 | 08/31/03 01:46p |
| TreeListResource.cpp | 547 | 12/11/01 10:50a |
| TreeListResource.h | 610 | 12/11/01 10:38a |
| TreeListStaticCtrl.h | 1,481 | 06/20/02 08:34p |
| TreeListStaticCtrl.cpp | 2,541 | 02/07/02 03:22a |
| TreeListTipCtrl.cpp | 10,206 | 03/17/02 08:03p |
| TreeListTipCtrl.h | 2,581 | 01/16/02 10:10a |
| TurboDLL.clw | 2,358 | 07/19/02 03:28p |
| TurboDLL.cpp | 1,833 | 12/11/01 10:50a |
| TurboDLL.def | 190 | 12/05/01 05:19p |
| TurboDLL.dep | 3,673 | 07/16/02 10:35p |
| TurboDLL.dsp | 8,427 | 11/04/03 11:11p |
| TurboDLL.dsw | 539 | 12/05/01 05:21p |
| TurboDLL.h | 201 | 12/11/01 10:50a |
| TurboDLL.mak | 11,152 | 08/31/03 12:36p |
| TurboDLL.plg | 3,508 | 09/04/03 09:14p |
| TurboDLL.rc | 5,011 | 11/04/03 10:30p |

List of files for directory
\Digital_Logger\Call Analyzer Source Code\
TurboDLL_src\TurboDLL\RES

| File Name | Size | Creation Date |
|---|---|---|
| TurboDLL.rc2 | 400 | 12/05/01 05:19p |

List of files for directory
\Digital_Logger\Call Analyzer Source Code\
TurboDLL_src\TurboDemo

| File Name | Size | Creation Date |
|---|---|---|
| ReadMe.txt | 3,633 | 09/19/02 09:11p |
| Resource.h | 730 | 09/20/02 10:12p |
| StdAfx.cpp | 211 | 09/19/02 09:11p |
| StdAfx.h | 1,092 | 09/19/02 09:22p |
| TurboDemo.clw | 1,414 | 09/20/02 10:13p |

Machine Format: IBM-PC
Operating System Compatibility: MS-Windows NT 4.0

| File Name | Size | Creation Date |
|---|---|---|
| TurboDemo.cpp | 2,105 | 09/19/02 09:11p |
| TurboDemo.dsp | 4,677 | 09/20/02 09:49p |
| TurboDemo.dsw | 541 | 09/19/02 09:11p |
| TurboDemo.h | 1,357 | 09/19/02 09:11p |
| TurboDemo.plg | 4,266 | 09/20/02 11:17p |
| TurboDemo.rc | 5,581 | 09/20/02 10:12p |
| TurboDemoDlg.cpp | 7,052 | 09/20/02 10:12p |
| TurboDemoDlg.h | 1,353 | 09/20/02 10:11p |
| TurboDragDlg.cpp | 9,814 | 09/20/02 10:15p |
| TurboDragDlg.h | 1,363 | 09/20/02 10:13p |

List of files for directory
\Digital_Logger\Call Analyzer Source Code\
TurboDLL_src\TurboDemo\res

| File Name | Size | Creation Date |
|---|---|---|
| TurboDemo.rc2 | 401 | 09/19/02 09:11p |

List of files for directory
\Digital_Logger\Call Analyzer Source Code\res

| File Name | Size | Creation Date |
|---|---|---|
| EvidenceBuilder.rc2 | 407 | 07/01/03 08:07p |

List of files for directory
\Digital_Logger\Main Product Source Code

| File Name | Size | Creation Date |
|---|---|---|
| AboutDlg.cpp | 454 | 04/13/03 07:59p |
| AboutDlg.h | 504 | 04/13/03 08:08p |
| areafill.cpp | 9,893 | 11/17/03 10:45p |
| areafill.h | 2,725 | 11/05/03 12:43p |
| AudioDeviceMappingDlg.cpp | 6,618 | 12/11/03 10:55a |
| AudioDeviceMappingDlg.h | 1,772 | 06/02/03 09:22p |
| Buffer.h | 2,959 | 04/23/03 07:23p |
| ChannelSettingsDlg.cpp | 22,815 | 11/18/03 08:19p |
| ChannelSettingsDlg.h | 3,325 | 07/14/03 09:13a |
| ChannelWnd.cpp | 51,238 | 01/08/04 02:59p |
| ChannelWnd.h | 4,734 | 01/07/04 01:02p |
| Color.cpp | 2,916 | 05/10/00 10:06p |
| Color.h | 2,776 | 05/10/00 10:31p |
| CxSkinButton.htm | 5,585 | 10/27/01 09:01p |
| DefaultAudioDeviceSelectionDlg.cpp | 2,811 | 01/06/04 10:19p |
| DefaultAudioDeviceSelectionDlg.h | 1,500 | 01/06/04 10:08p |
| Defines.h | 1,030 | 01/06/04 04:18p |
| DeviceList.cpp | 3,889 | 08/12/03 05:32a |
| DeviceList.h | 1,206 | 08/11/03 09:57p |
| devnode.c | 5,834 | 05/30/03 08:35p |
| enum.cpp | 53,351 | 06/20/03 06:01a |
| Globals.cpp | 135 | 04/13/03 07:31p |
| Globals.h | 1,286 | 01/07/04 09:19a |
| hidport.h.bak | 5,041 | 07/26/00 10:33a |
| main.cpp | 767 | 10/29/03 08:20p |
| MIL8000U.clw | 6,123 | 01/08/04 03:00p |
| MIL8000U.cpp | 8,006 | 01/08/04 02:15p |
| MIL8000U.dsp | 10,575 | 01/06/04 11:44p |
| MIL8000U.h | 1,286 | 07/12/03 10:27p |
| MIL8000U.plg | 252 | 01/08/04 03:18p |
| MIL8000U.rc | 22,330 | 01/08/04 03:00p |
| MIL8000UDlg.cpp | 14,648 | 01/07/04 09:04a |
| MIL8000UDlg.h | 2,408 | 01/06/04 04:18p |
| resource.h | 11,552 | 01/06/04 09:46p |
| SetupWizardIntroPage.cpp | 1,260 | 04/16/03 07:01a |
| SetupWizardIntroPage.h | 1,336 | 04/16/03 07:05a |
| SetupWizardSheet.cpp | 1,072 | 04/16/03 07:02a |
| SetupWizardSheet.h | 1,409 | 04/16/03 07:02a |
| StdAfx.cpp | 600 | 12/11/03 11:51a |
| StdAfx.h | 1,981 | 11/19/03 01:03p |
| StereoWaveIn.cpp | 2,286 | 04/23/03 07:28p |
| StereoWaveIn.h | 1,449 | 05/11/03 12:11p |
| ThresholdArrow.cpp | 726 | 04/10/03 08:36p |
| ThresholdArrow.h | 1,202 | 04/10/03 08:36p |
| TitleTip.cpp | 4,160 | 11/21/02 01:17p |
| TitleTip.h | 985 | 02/04/03 08:59a |
| TwoColorStatic.cpp | 2,081 | 04/14/03 07:06a |
| TwoColorStatic.h | 1,184 | 04/10/03 12:52p |
| USBAudioPortMapper.h | 1,644 | 11/18/03 08:08p |
| USBAudioPortMapper.cpp | 16,985 | 11/18/03 08:17p |
| usbdesc.h | 9,258 | 07/26/00 10:34a |
| usbid.cpp | 9,824 | 10/29/03 08:23p |
| usbid.dsp | 4,193 | 10/18/03 11:21p |
| usbid.dsw | 533 | 10/17/03 10:01p |
| usbid.h | 229 | 10/29/03 08:21p |
| usbid.plg | 1,198 | 10/30/03 05:44p |
| usbview.h | 5,718 | 05/22/03 10:17p |
| VUMeter.cpp | 34,126 | 01/07/04 12:36p |
| VUMeter.h | 2,537 | 01/07/04 09:17a |
| WaveInMgr.cpp | 10,933 | 01/07/04 01:00p |
| WaveInMgr.h | 1,350 | 04/22/03 09:33a |
| WaveInThread.cpp | 2,508 | 01/06/04 10:35p |
| WaveInThread.h | 1,708 | 06/01/03 02:44p |
| xSkinButton.cpp | 25,865 | 04/16/03 01:05p |
| xSkinButton.h | 3,524 | 04/16/03 01:06p |

List of files for directory
\Digital_Logger\Main Product Source Code\
CxSkinButton_demo

| File Name | Size | Creation Date |
|---|---|---|
| CxSkinButtonDemo.clw | 2,133 | 06/24/01 07:13p |
| CxSkinButtonDemo.cpp | 1,601 | 03/19/01 08:06p |
| CxSkinButtonDemo.dsw | 646 | 03/29/01 08:22a |
| CxSkinButtonDemo.dsp | 6,594 | 06/24/01 06:41p |
| CxSkinButtonDemo.h | 1,292 | 03/19/01 08:06p |
| CxSkinButtonDemo.rc | 7,243 | 06/24/01 07:13p |
| CxSkinButtonDemoDlg.h | 1,774 | 06/24/01 05:31p |
| CxSkinButtonDemoDlg.cpp | 4,687 | 06/24/01 06:19p |
| resource.h | 2,413 | 06/24/01 06:19p |
| StdAfx.cpp | 218 | 03/19/01 08:06p |
| StdAfx.h | 1,054 | 03/19/01 08:06p |
| xSkinButton.cpp | 25,655 | 10/27/01 08:54p |
| xSkinButton.h | 3,435 | 10/27/01 08:54p |
| xStaticText.cpp | 5,826 | 03/31/01 07:58a |
| xStaticText.h | 1,746 | 03/31/01 07:55a |

List of files for directory
\Digital_Logger\Main Product Source Code\
CxSkinButton_demo\doc

| File Name | Size | Creation Date |
|---|---|---|
| CxSkinButton.htm | 5,586 | 10/27/01 08:58p |

List of files for directory
\Digital_Logger\Main Product Source Code\
CxSkinButton_demo\res

| File Name | Size | Creation Date |
|---|---|---|
| CxSkinButtonDemo.rc2 | 408 | 03/19/01 08:06p |

List of files for directory
\Digital_Logger\Main Product Source Code\Help

| File Name | Size | Creation Date |
|---|---|---|
| Copy of MIL-8000 Help.htm | 58,397 | 07/12/03 09:59p |
| MIL-8000 Help.htm | 376,146 | 01/08/04 03:09p |

List of files for directory
\Digital_Logger\Main Product Source Code\
Help\Copy of MIL-8000 Help_files

| File Name | Size | Creation Date |
|---|---|---|
| filelist.xml | 1,036 | 07/12/03 09:59p |

List of files for directory
\Digital_Logger\Main Product Source Code\
Help\Copy of images

| File Name | Size | Creation Date |
|---|---|---|
| filelist.xml | 588 | 07/10/03 05:31a |

List of files for directory
\Digital_Logger\Main Product Source Code\
Help\MIL-8000 Help_files

| File Name | Size | Creation Date |
|---|---|---|
| filelist.xml | 2,092 | 01/08/04 03:09p |

List of files for directory
\Digital_Logger\Main Product Source Code\
Help\images.bak

| File Name | Size | Creation Date |
|---|---|---|
| filelist.xml | 588 | 07/10/03 05:31a |

List of files for directory
\Digital_Logger\Main Product Source Code\res

| File Name | Size | Creation Date |
|---|---|---|
| MIL8000U.rc2 | 400 | 04/09/03 01:19p |

List of files for directory
\Digital_Logger\T1 Logger Source Code

| File Name | Size | Creation Date |
|---|---|---|
| ATT01413.txt | 86 | 04/01/04 09:33a |
| ChannelManager.cpp | 22,165 | 11/20/03 07:48a |

Machine Format: IBM-PC
Operating System Compatibility: MS-Windows NT 4.0

| File Name | Size | Creation Date |
|---|---|---|
| ChannelManager.h | 3,682 | 11/20/03 07:48a |
| ChannelModes.h | 174 | 11/20/03 07:48a |
| ChannelModes.old | 174 | 11/20/03 07:48a |
| Channels.cpp | 12,048 | 11/20/03 07:48a |
| common.cpp | 7,098 | 11/20/03 07:48a |
| ErrMsgApp.h | 2,572 | 11/20/03 07:48a |
| ErrMsgApp.mc | 1,956 | 11/20/03 07:48a |
| IniFile.cpp | 5,356 | 11/20/03 07:48a |
| IniFile.h | 1,226 | 11/20/03 07:48a |
| logger.rc | 3,327 | 11/20/03 07:48a |
| Logger24.cpp | 2,627 | 11/20/03 07:48a |
| Logger24.h | 1,245 | 11/20/03 07:48a |
| main.cpp | 5,713 | 11/20/03 07:48a |
| make_package.bat | 338 | 11/20/03 07:48a |
| Message.h | 2,370 | 11/20/03 07:48a |
| Purge.cpp | 7,534 | 11/20/03 07:48a |
| PurgeChannel.cpp | 12,898 | 11/20/03 07:48a |
| PurgeChannel.h | 2,437 | 11/20/03 07:48a |
| PurgeDrive.cpp | 5,675 | 11/20/03 07:48a |
| PurgeDrive.h | 2,229 | 11/20/03 07:48a |
| PurgeTask.cpp | 9,854 | 11/20/03 07:48a |
| PurgeTask.h | 1,966 | 11/20/03 07:48a |
| SystemTask.h | 636 | 11/20/03 07:48a |
| Task.cpp | 2,167 | 11/20/03 07:48a |
| Task.h | 1,969 | 11/20/03 07:48a |
| VuWindow.h | 2,203 | 11/20/03 07:48a |
| WorkerTask.h | 3,350 | 11/20/03 07:48a |
| List of files for directory \Digital_Logger\T1 Logger Source Code\CVS | | |
| Entries | 83 | 11/20/03 07:48a |
| Repository | 37 | 11/20/03 07:48a |
| Root | 48 | 11/20/03 07:48a |
| List of files for directory \Digital_Logger\T1 Logger Source Code\T1LoggerDrv | | |
| dirs | 15 | 11/20/03 07:48a |
| readme.txt | 1,619 | 11/20/03 07:48a |
| T1LoggerDrv.dsw | 447 | 11/20/03 07:48a |
| T1LoggerDrvioctl.cpp | 7,384 | 11/20/03 07:48a |
| T1LoggerDrvioctl.h | 1,558 | 11/20/03 07:48a |
| List of files for directory \Digital_Logger\T1 Logger Source Code\T1LoggerDrv\CVS | | |
| Entries | 401 | 11/20/03 07:48a |
| Repository | 49 | 11/20/03 07:48a |
| Root | 48 | 11/20/03 07:48a |
| List of files for directory \Digital_Logger\T1 Logger Source Code\T1LoggerDrv\FX2\CVS | | |
| Entries | 141 | 11/20/03 07:48a |
| Repository | 53 | 11/20/03 07:48a |
| Root | 48 | 11/20/03 07:48a |
| List of files for directory \Digital_Logger\T1 Logger Source Code\T1LoggerDrv\FX2\FIFO | | |
| command.c51 | 940 | 11/20/03 07:48a |
| command.h | 1,649 | 11/20/03 07:48a |
| DLSLIB.c51 | 2,678 | 11/20/03 07:48a |
| DLSLIB.h | 701 | 11/20/03 07:48a |
| DS2152.C51 | 16,556 | 11/20/03 07:48a |
| DS2152.H | 7,903 | 11/20/03 07:48a |
| FIFOLIB.c51 | 7,388 | 11/20/03 07:48a |
| FIFOLIB.h | 1,420 | 11/20/03 07:48a |
| T1Logger.c51 | 364 | 11/20/03 07:48a |
| T1Logger.Uv2 | 1,848 | 11/20/03 07:48a |
| List of files for directory \Digital_Logger\T1 Logger Source Code\T1LoggerDrv\FX2\FIFO\CVS | | |
| Entries | 516 | 11/20/03 07:48a |
| Repository | 58 | 11/20/03 07:48a |
| Root | 48 | 11/20/03 07:48a |
| List of files for directory \Digital_Logger\T1 Logger Source Code\T1LoggerDrv\FX2\FIFO_01 | | |
| build.bat | 1,956 | 11/20/03 07:48a |
| bulkloop.c | 11,296 | 11/20/03 07:48a |
| bulkloop.Uv2 | 2,069 | 11/20/03 07:48a |
| dscr._i | 33 | 11/20/03 07:48a |
| dscr.a51 | 7,222 | 11/20/03 07:48a |
| fw.c | 13,513 | 11/20/03 07:48a |
| List of files for directory \Digital_Logger\T1 Logger Source Code\T1LoggerDrv\FX2\FIFO_01\CVS | | |
| Entries | 327 | 11/20/03 07:48a |
| Repository | 61 | 11/20/03 07:48a |
| Root | 48 | 11/20/03 07:48a |
| List of files for directory \Digital_Logger\T1 Logger Source Code\T1LoggerDrv\FX2\FIFO_TO_IBM_BTH_26 | | |
| build.bat | 1,956 | 11/20/03 07:48a |
| bulkloop.c | 7,630 | 11/20/03 07:48a |
| bulkloop.Uv2 | 2,231 | 03/19/04 11:26a |
| code.c | 26,511 | 11/20/03 07:48a |
| dscr.a51 | 8,950 | 11/20/03 07:48a |
| fw.c | 13,507 | 11/20/03 07:48a |
| mkloader.bat | 73 | 11/20/03 07:48a |
| List of files for directory \Digital_Logger\T1 Logger Source | | |
| Entries | 551 | 11/20/03 07:48a |
| Repository | 72 | 11/20/03 07:48a |
| Root | 48 | 11/20/03 07:48a |
| List of files for directory \Digital_Logger\T1 Logger Source Code\T1LoggerDrv\FX2\FIFO_TO_IBM_BTH_46 | | |
| build.bat | 1,956 | 11/20/03 07:48a |
| bulkloop._i | 33 | 11/20/03 07:48a |
| bulkloop.c | 10,136 | 11/20/03 07:48a |
| bulkloop.Uv2 | 2,068 | 11/20/03 07:48a |
| DLSLIB._i | 80 | 11/20/03 07:48a |
| dscr._i | 33 | 11/20/03 07:48a |
| dscr.a51 | 7,676 | 11/20/03 07:48a |
| FIFOLIB._i | 83 | 11/20/03 07:48a |
| fw.c | 13,505 | 11/20/03 07:48a |
| List of files for directory \Digital_Logger\T1 Logger Source | | |
| Entries | 474 | 11/20/03 07:48a |
| Repository | 72 | 11/20/03 07:48a |
| Root | 48 | 11/20/03 07:48a |
| List of files for directory \Digital_Logger\T1 Logger Source Code\T1LoggerDrv\FX2\FIFO_TO_IBM_EP4 | | |
| build.bat | 1,956 | 11/20/03 07:48a |
| bulkloop._i | 33 | 11/20/03 07:48a |
| bulkloop.c | 10,134 | 11/20/03 07:48a |
| bulkloop.Uv2 | 2,068 | 11/20/03 07:48a |
| DLSLIB._i | 80 | 11/20/03 07:48a |
| dscr._i | 33 | 11/20/03 07:48a |
| dscr.a51 | 7,222 | 11/20/03 07:48a |
| FIFOLIB._i | 83 | 11/20/03 07:48a |
| fw.c | 13,505 | 11/20/03 07:48a |
| List of files for directory \Digital_Logger\T1 Logger Source Code\T1LoggerDrv\FX2\FIFO_TO_IBM_EP4\CVS | | |
| Entries | 474 | 11/20/03 07:48a |
| Repository | 69 | 11/20/03 07:48a |
| Root | 48 | 11/20/03 07:48a |
| List of files for directory \Digital_Logger\T1 Logger Source Code\ | | |

Machine Format: IBM-PC
Operating System Compatibility: MS-Windows NT 4.0

| File Name | Size | Creation Date |
|---|---|---|
| T1LoggerDrv\FX2\FIFO_TO_IBM_EP6 | | |
| build.bat | 1,956 | 11/20/03 07:48a |
| bulkloop.c | 13,267 | 11/20/03 07:48a |
| bulkloop.Uv2 | 2,068 | 11/20/03 07:48a |
| DLSLIB._i | 80 | 11/20/03 07:48a |
| dscr._i | 33 | 11/20/03 07:48a |
| dscr.a51 | 7,222 | 11/20/03 07:48a |
| FIFOLIB._i | 83 | 11/20/03 07:48a |
| fw.c | 13,505 | 11/20/03 07:48a |
| List of files for directory \Digital_Logger\T1 Logger Source Code\T1LoggerDrv\FX2\FIFO_TO_IBM_EP6\CVS | | |
| Entries | 424 | 11/20/03 07:48a |
| Repository | 69 | 11/20/03 07:48a |
| Root | 48 | 11/20/03 07:48a |
| List of files for directory \Digital_Logger\T1 Logger Source Code\T1LoggerDrv\FX2\T1Logger | | |
| DS2152.C51 | 16,554 | 11/20/03 07:48a |
| DS2152.H | 7,903 | 11/20/03 07:48a |
| T1Logger.c51 | 1,924 | 11/20/03 07:48a |
| T1Logger.Uv2 | 1,697 | 11/20/03 07:48a |
| List of files for directory \Digital_Logger\T1 Logger Source Code\T1LoggerDrv\FX2\T1Logger\CVS | | |
| Entries | 246 | 11/20/03 07:48a |
| Repository | 62 | 11/20/03 07:48a |
| Root | 48 | 11/20/03 07:48a |
| List of files for directory \Digital_Logger\T1 Logger Source Code\T1LoggerDrv\SoundByChannel | | |
| CommonDefinitions.h | 1,296 | 11/20/03 07:48a |
| ReadMe.txt | 1,244 | 11/20/03 07:48a |
| SoundRecoder.cpp | 2,701 | 11/20/03 07:48a |
| SoundRecoder.dsp | 5,096 | 11/20/03 07:48a |
| SoundRecoder.dsw | 547 | 11/20/03 07:48a |
| SoundRecorderConsole.h | 763 | 11/20/03 07:48a |
| SoundRecorderConsole.cpp | 1,571 | 11/20/03 07:48a |
| StdAfx.cpp | 299 | 11/20/03 07:48a |
| StdAfx.h | 667 | 11/20/03 07:48a |
| USBAdapterOLD.cpp | 3,728 | 11/20/03 07:48a |
| USBAdapterOLD.h | 1,528 | 11/20/03 07:48a |
| List of files for directory \Digital_Logger\T1 Logger Source Code\T1LoggerDrv\SoundByChannel\CVS | | |
| Entries | 648 | 11/20/03 07:48a |
| Repository | 64 | 11/20/03 07:48a |
| Root | 48 | 11/20/03 07:48a |
| List of files for directory \Digital_Logger\T1 Logger Source Code\T1LoggerDrv\SoundRecoder | | |
| CommonDefinitions.h | 1,296 | 11/20/03 07:48a |
| ReadMe.txt | 1,244 | 11/20/03 07:48a |
| SoundRecoder.cpp | 2,704 | 11/20/03 07:48a |
| SoundRecoder.dsp | 5,096 | 11/20/03 07:48a |
| SoundRecoder.dsw | 547 | 11/20/03 07:48a |
| SoundRecorderConsole.h | 763 | 11/20/03 07:48a |
| SoundRecorderConsole.cpp | 1,910 | 11/20/03 07:48a |
| StdAfx.cpp | 299 | 11/20/03 07:48a |
| StdAfx.h | 667 | 11/20/03 07:48a |
| USBAdapter.cpp | 2,493 | 11/20/03 07:48a |
| USBAdapter.h | 1,089 | 11/20/03 07:48a |
| List of files for directory \Digital_Logger\T1 Logger Source Code\T1LoggerDrv\SoundRecoder\CVS | | |
| Entries | 686 | 11/20/03 07:48a |
| Repository | 62 | 11/20/03 07:48a |
| Root | 48 | 11/20/03 07:48a |
| List of files for directory \Digital_Logger\T1 Logger Source Code\T1LoggerDrv\exe | | |
| CommonDefinitions.h | 1,296 | 11/20/03 07:48a |
| makefile | 295 | 11/20/03 07:48a |
| sources | 900 | 11/20/03 07:48a |
| Test_T1LoggerDrv.cpp | 5,997 | 11/20/03 07:48a |
| Test_T1LoggerDrv.dsp | 8,033 | 11/20/03 07:48a |
| USBAdapter.cpp | 13,324 | 11/20/03 07:48a |
| USBAdapter.h | 2,829 | 11/20/03 07:48a |
| List of files for directory \Digital_Logger\T1 Logger Source Code\T1LoggerDrv\exe\CVS | | |
| Entries | 369 | 11/20/03 07:48a |
| Repository | 53 | 11/20/03 07:48a |
| Root | 48 | 11/20/03 07:48a |
| List of files for directory \Digital_Logger\T1 Logger Source Code\T1LoggerDrv\ezloader | | |
| buildchk.log | 477 | 11/20/03 07:48a |
| buildfre.log | 1,464 | 11/20/03 07:48a |
| code.c | 26,511 | 11/20/03 07:48a |
| ezloader.c | 27,750 | 11/20/03 07:48a |
| ezloader.h | 4,590 | 11/20/03 07:48a |
| ezloader.rc | 2,430 | 11/20/03 07:48a |
| firmware.c | 14,634 | 11/20/03 07:48a |
| loader.c | 7,513 | 11/20/03 07:48a |
| Makefile | 670 | 11/20/03 07:48a |
| resource.h | 412 | 11/20/03 07:48a |
| Sources | 1,063 | 11/20/03 07:48a |
| T1LoggerLdr.inf | 3,225 | 11/20/03 07:48a |
| T1LoggerLdr.old | 1,415 | 11/20/03 07:48a |
| List of files for directory \Digital_Logger\T1 Logger Source Code\T1LoggerDrv\ezloader\CVS | | |
| Entries | 666 | 11/20/03 07:48a |
| Repository | 58 | 11/20/03 07:48a |
| Root | 48 | 11/20/03 07:48a |
| List of files for directory \Digital_Logger\T1 Logger Source Code\T1LoggerDrv\ezloader\lib\CVS | | |
| Entries | 12 | 11/20/03 07:48a |
| Repository | 62 | 11/20/03 07:48a |
| Root | 48 | 11/20/03 07:48a |
| List of files for directory \Digital_Logger\T1 Logger Source Code\T1LoggerDrv\ezloader\lib\i386\CVS | | |
| Entries | 116 | 11/20/03 07:48a |
| Repository | 67 | 11/20/03 07:48a |
| Root | 48 | 11/20/03 07:48a |
| List of files for directory \Digital_Logger\T1 Logger Source Code\T1LoggerDrv\ezloader\lib\i386\free | | |
| readme.txt | 40 | 11/20/03 07:48a |
| List of files for directory \Digital_Logger\T1 Logger Source | | |
| Entries | 152 | 11/20/03 07:48a |
| Repository | 72 | 11/20/03 07:48a |
| Root | 48 | 11/20/03 07:48a |
| List of files for directory \Digital_Logger\T1 Logger Source Code\T1LoggerDrv\ezloader\obj\CVS | | |
| Entries | 49 | 11/20/03 07:48a |
| Repository | 62 | 11/20/03 07:48a |
| Root | 48 | 11/20/03 07:48a |
| List of files for directory \Digital_Logger\T1 Logger Source Code\T1LoggerDrv\sys | | |

Machine Format: IBM-PC
Operating System Compatibility: MS-Windows NT 4.0

| File Name | Size | Creation Date |
|---|---|---|
| buildfre.err | 396 | 11/20/03 07:48a |
| buildfre.log | 4,212 | 11/20/03 07:48a |
| function.h | 509 | 11/20/03 07:48a |
| makefile | 295 | 11/20/03 07:48a |
| makefile.inc | 122 | 11/20/03 07:48a |
| msglog.h | 2,585 | 11/20/03 07:48a |
| msglog.mc | 1,916 | 11/20/03 07:48a |
| msglog.rc | 37 | 11/20/03 07:48a |
| sources | 1,208 | 11/20/03 07:48a |
| T1LoggerDrv.cpp | 4,895 | 11/20/03 07:48a |
| T1LoggerDrv.dsp | 27,545 | 11/20/03 07:48a |
| T1LoggerDrv.h | 669 | 11/20/03 07:48a |
| T1LoggerDrv.inf | 3,139 | 11/20/03 07:48a |
| T1LoggerDrv.rc | 2,039 | 11/20/03 07:48a |
| T1LoggerDrvDevice.cpp | 46,521 | 11/20/03 07:48a |
| T1LoggerDrvDevice.h | 3,375 | 11/20/03 07:48a |
| TransferingQueue.h | 4,395 | 11/20/03 07:48a |

List of files for directory
\Digital_Logger\T1 Logger Source Code\T1LoggerDrv\sys\CVS

| File Name | Size | Creation Date |
|---|---|---|
| Entries | 999 | 11/20/03 07:48a |
| Repository | 53 | 11/20/03 07:48a |
| Root | 48 | 11/20/03 07:48a |

List of files for directory
\Digital_Logger\T1 Logger Source Code\T1LoggerDrv\sys\obj\CVS

| File Name | Size | Creation Date |
|---|---|---|
| Entries | 53 | 11/20/03 07:48a |
| Repository | 57 | 11/20/03 07:48a |
| Root | 48 | 11/20/03 07:48a |

List of files for directory
\Digital_Logger\T1 Logger Source Code\T1LoggerDrv\sys\objchk\CVS

| File Name | Size | Creation Date |
|---|---|---|
| Entries | 12 | 11/20/03 07:48a |
| Repository | 60 | 11/20/03 07:48a |
| Root | 48 | 11/20/03 07:48a |

List of files for directory
\Digital_Logger\T1 Logger Source Code\T1LoggerDrv\sys\objchk\i386\CVS

| File Name | Size | Creation Date |
|---|---|---|
| Entries | 55 | 11/20/03 07:48a |
| Repository | 65 | 11/20/03 07:48a |
| Root | 48 | 11/20/03 07:48a |

List of files for directory
\Digital_Logger\T1 Logger Source Code\T1LoggerDrv\sys\objfre\CVS

| File Name | Size | Creation Date |
|---|---|---|
| Entries | 12 | 11/20/03 07:48a |
| Repository | 60 | 11/20/03 07:48a |
| Root | 48 | 11/20/03 07:48a |

List of files for directory
\Digital_Logger\T1 Logger Source Code\T1LoggerDrv\sys\objfre\i386\CVS

| File Name | Size | Creation Date |
|---|---|---|
| Entries | 55 | 11/20/03 07:48a |
| Repository | 65 | 11/20/03 07:48a |
| Root | 48 | 11/20/03 07:48a |

List of files for directory
\Digital_Logger\T1 Logger Source Code\USB2T1

| File Name | Size | Creation Date |
|---|---|---|
| attantion.txt | 176 | 11/20/03 07:48a |
| ChannelLevelAdapter.cpp | 11,942 | 11/20/03 07:48a |
| ChannelLevelAdapter.h | 3,010 | 11/20/03 07:48a |
| CLSID_USB2T1.CPP | 240 | 11/20/03 07:48a |
| CLSID_USB2T1.H | 154 | 11/20/03 07:48a |
| CommonDefinitions.h | 161 | 11/20/03 07:48a |
| IAudioLoggerAdapterImplementation.cpp | 6,261 | 11/20/03 07:48a |
| InterfaceDefinition.h | 414 | 11/20/03 07:48a |
| InterfaceIncludes.h | 190 | 11/20/03 07:48a |
| REDEBUG.BAT | 30 | 11/20/03 07:48a |
| reg.BAT | 22 | 11/20/03 07:48a |
| RERELEAS.BAT | 33 | 11/20/03 07:48a |
| SearchInterfaceMacros.h | 137 | 11/20/03 07:48a |
| Server.cpp | 1,439 | 11/20/03 07:48a |
| T1LevelAdapter.cpp | 20,362 | 11/20/03 07:48a |
| T1LevelAdapter.h | 3,323 | 11/20/03 07:48a |
| USB2T1.cpp | 6,015 | 11/20/03 07:48a |
| USB2T1.DEF | 264 | 11/20/03 07:48a |
| USB2T1.dsp | 6,973 | 11/20/03 07:48a |
| USB2T1.dsw | 1,355 | 11/20/03 07:48a |
| USB2T1.h | 1,938 | 11/20/03 07:48a |
| USB2T1_Const.h | 494 | 11/20/03 07:48a |
| USB2T1Config.cpp | 11,836 | 11/20/03 07:48a |
| USB2T1Config.h | 3,932 | 11/20/03 07:48a |

List of files for directory
\Digital_Logger\T1 Logger Source Code\USB2T1\CVS

| File Name | Size | Creation Date |
|---|---|---|
| Entries | 1,298 | 11/20/03 07:48a |
| Repository | 44 | 11/20/03 07:48a |
| Root | 48 | 11/20/03 07:48a |

List of files for directory
\Digital_Logger\T1 Logger Source Code\USB2T1\GenSignPattern

| File Name | Size | Creation Date |
|---|---|---|
| GenSignPattern.cpp | 2,203 | 11/20/03 07:48a |
| GenSignPattern.dsp | 4,632 | 11/20/03 07:48a |
| GenSignPattern.dsw | 551 | 11/20/03 07:48a |
| ReadMe.txt | 1,256 | 11/20/03 07:48a |
| StdAfx.cpp | 301 | 11/20/03 07:48a |
| StdAfx.h | 667 | 11/20/03 07:48a |

List of files for directory
\Digital_Logger\T1 Logger Source Code\USB2T1\GenSignPattern\CVS

| File Name | Size | Creation Date |
|---|---|---|
| Entries | 289 | 11/20/03 07:48a |
| Repository | 59 | 11/20/03 07:48a |
| Root | 48 | 11/20/03 07:48a |

List of files for directory
\Digital_Logger\USB Device Identifier Source Code

| File Name | Size | Creation Date |
|---|---|---|
| main.cpp | 767 | 10/29/03 08:20p |
| usbid.cpp | 9,824 | 10/29/03 08:23p |
| usbid.dsp | 4,193 | 10/18/03 11:21p |
| usbid.dsw | 533 | 10/17/03 10:01p |
| usbid.h | 229 | 10/29/03 08:21p |
| usbid.plg | 1,198 | 10/30/03 05:44p |

List of files for directory
\Digital_Logger\Utilities and Libraries

| File Name | Size | Creation Date |
|---|---|---|
| AUHeader.h | 15,870 | 10/06/03 07:26a |
| BrowseForFolder.cpp | 4,161 | 05/19/98 09:00p |
| BrowseForFolder.h | 5,602 | 05/02/03 01:25p |
| CancelException.h | 156 | 04/17/02 07:35a |
| ComboInListView.cpp | 3,224 | 12/03/02 06:01a |
| ComboInListView.h | 1,611 | 12/22/98 01:18p |
| Copy of Folder.cpp | 22,974 | 08/28/03 11:47a |
| Copy of Folder.h | 7,481 | 08/28/03 11:35a |
| DelayedDirectoryChangeHandler.h | 4,948 | 11/24/01 04:18p |
| DelayedDirectoryChangeHandler.cpp | 10,720 | 05/14/02 07:46p |
| DeletionThread.cpp | 6,677 | 08/06/03 05:20a |
| DeletionThread.h | 2,553 | 05/02/02 07:00p |
| DirectoryChanges.cpp | 48,153 | 09/16/02 10:46a |
| DirectoryChanges.h | 11,216 | 09/16/02 10:19a |
| FilterParams.cpp | 5,766 | 10/13/03 08:34p |
| FilterParams.h | 2,581 | 10/13/03 08:29p |
| Folder.cpp | 21,302 | 11/04/03 09:07p |
| Folder.h | 5,571 | 10/15/03 12:27p |
| FolderArray.h | 617 | 05/15/02 07:41p |
| IMapi.cpp | 5,883 | 02/03/99 02:37p |
| IMapi.h | 1,217 | 10/06/98 01:46p |
| listeditctrl.cpp | 3,413 | 12/03/02 06:01a |
| listeditctrl.h | 1,496 | 12/22/98 01:18p |
| ListViewFrame.cpp | 4,207 | 05/15/02 06:53p |
| Log.cpp | 1,408 | 01/30/04 10:55a |
| Log.h | 1,175 | 01/30/04 07:22a |
| MIL2400INIFile.cpp | 35,036 | 07/14/03 08:59a |
| MIL2400INIFile.h | 3,204 | 07/14/03 08:59a |
| MILAddress.cpp | 1,598 | 09/08/03 01:36p |

-continued

Machine Format: IBM-PC
Operating System Compatibility: MS-Windows NT 4.0

| File Name | Size | Creation Date |
|---|---|---|
| MILAddress.h | 954 | 09/08/03 01:36a |
| MILDateTime.cpp | 821 | 09/08/03 10:08a |
| MILDateTime.h | 1,145 | 09/08/03 09:01a |
| NewHeaderCtrl.cpp | 8,471 | 03/12/02 08:40p |
| NewHeaderCtrl.h | 3,028 | 03/12/02 08:40p |
| PlayerBuffer.h | 6,660 | 01/08/02 10:18a |
| RCa01324 | 6,958 | 02/13/03 09:14p |
| Readme.txt | 1,461 | 05/02/02 06:30p |
| Recording.cpp | 88,098 | 01/31/04 02:46p |
| Recording.h | 15,041 | 01/12/04 08:34a |
| Recording.h.bak | 11,409 | 08/05/03 03:32p |
| registry.cpp | 16,158 | 06/09/03 05:34a |
| registry.h | 2,227 | 06/09/03 05:34a |
| resource.h | 780 | 10/08/03 06:29a |
| SampleSpecs.h | 547 | 01/19/99 04:45p |
| SBDestination.cpp | 1,132 | 04/25/98 09:22a |
| SBDestination.h | 910 | 05/02/02 07:00p |
| StdAfx.cpp | 205 | 05/02/02 06:30p |
| StdAfx.h | 873 | 08/08/03 07:24a |
| supergridctrl.cpp | 63,319 | 12/03/02 05:52a |
| supergridctrl.h | 16,811 | 12/03/02 05:49a |
| TreeListCtrl.cpp | 24,936 | 08/27/03 07:33a |
| UtilFunctions.cpp | 73,795 | 01/28/04 08:23a |
| UtilFunctions.h | 8,072 | 01/28/04 08:23a |
| UtilLib.dsp | 9,883 | 01/13/04 10:55p |
| UtilLib.plg | 249 | 06/09/03 05:13a |
| UtilLib.rc | 5,044 | 02/14/03 09:50a |
| UtilLib.stc | 43 | 09/13/02 09:20a |
| UtilLib.stt | 43 | 08/05/02 07:05a |
| WaveIn.cpp | 15,265 | 01/07/04 12:39p |
| WaveIn.h | 1,921 | 07/01/03 03:09p |
| WaveOut.cpp | 1,411 | 08/05/03 09:12p |
| WaveOut.h | 1,271 | 08/05/03 09:09p |
| xSkinButton.cpp | 25,655 | 10/27/01 08:54p |
| xSkinButton.h | 3,435 | 10/27/01 08:54p |

List of files for directory
\Digital_Logger\Utilities and Libraries\res

| UtilLib.rc2 | 399 | 02/14/03 09:50a |

COPYRIGHT NOTICE

A portion of the disclosure of this patent document contains copyrighted material. The copyright owner hereby grants others a right to reproduce copies of the patent document or the patent disclosure exactly as it appears in the files of the United States Patent and Trademark Office, but otherwise reserves all copyright rights whatsoever.

BACKGROUND OF THE INVENTION

1. Field of the Invention

The present invention relates generally to data recording, and more particularly to systems for recording voice communications as compressed digital data.

2. Description of the Prior Art

U.S. Pat. No. 6,122,239 ("the '239 patent") entitled "Pre-Mastering, Archival Optical Recorder That Provides Extended Recording Time" discloses both a pre-mastering, optical recorder and a logging workstation which both receive and condition an analog signal. Both the recorder and the workstation, sometimes referred to as digital loggers, then digitize the conditioned signal storing the digitized data thus obtained in a buffer, preferably either a large RAM or a hard disk. When the digitized data occupies more than a pre-established fraction of the buffer, both the recorder and the workstation further compress the data to recover buffer space thereby permitting recording to continue. The recorder also pre-masters the data for recording onto optical-recording media using an optical-disk recorder included in the digital logger. Instead of an optical-disk recorder, the workstation includes a network interface circuit that interfaces the workstation with a network thereby permitting the logger to transmit digital audio data via the network for recording either to a pre-mastering, optical recorder, or to a digital logger recorder.

Presently, a variety of systems exist, analogous to that described in the '239 patent, for concurrently recording several audio signals from various sources including telephone and radio signals. Usually such systems are self-contained and include:

1. a dedicated microprocessor which operates as a local storage controller; and
2. a Digital Signal Processing ("DSP") co-processor, usually connected via a Peripheral Component Interface ("PCI") bus, to the dedicated microprocessor.

Systems of this type exhibit decided disadvantages which include complexity, cost, and difficulty in configuration.

BRIEF SUMMARY OF THE INVENTION

An object of the present invention is to provide a lower-cost multi-channel digital logger system.

Another object of the present invention is to provide a simpler multi-channel digital logger system.

Another object of the present invention is to provide a more cost-effective multi-channel digital logger system.

Another object of the present invention is to provide a multi-channel digital logger system that is simpler to manufacture.

Another object of the present invention is to provide a multi-channel digital logger system that is easier to configure.

Another object of the present invention is to provide a multi-channel digital logger system that is economical to manufacture.

Another object of the present invention is to provide a digital logger system which includes a linear CODEC for digitizing audio data, the digital audio data being subsequently converted by a software computer program of digital logger system into µLaw compressed digital audio data before recording the compressed digital audio data.

Another object of the present invention is to provide a digital logger system that augments information about a recorded telephone call with additional information autonomously retrieved from publicly accessible databases.

Briefly, the present invention in one embodiment is a digital logger system adapted for receiving and recording audio telecommunication signals. The digital logger system includes a multichannel interface circuit adapted:

1. for concurrently and continuously receiving audio telecommunication signals for at least two telephone calls; and
2. for continuously transmitting digital audio data extracted from the received audio telecommunication signals.

The digital logger system also includes a Universal Serial Bus ("USB") hub:

1. for receiving the digital audio data continuously transmitted from the multichannel interface circuit; and
2. for transmitting the digital audio data to a USB root hub.

Lastly, the digital logger system includes a personal computer ("PC") having a USB root hub that is coupled to the USB hub. The PC receives the digital audio data transmitted from the USB hub, and executes PC software. The PC software continuously monitors the received digital audio data for decoding line status and signaling information embedded in digital audio data to determine status of a telephone line including a telephone line "going off hook." Upon detecting a telephone line "going off hook," the PC software records both:
1. an audio header that stores information about a telephone call; and
2. an audio file that stores compressed digital audio data for the telephone call.

In another embodiment the present invention is an improved digital logger system adapted for receiving and recording audio telecommunication signals. The digital logger system including a PC which executes PC software that:
1. monitors digital audio data of audio telecommunication signals for line status and signaling information embedded in digital audio data to determine status of a telephone line including a telephone line "going off hook;" and
2. upon detecting a telephone line "going off hook," records both:
   a. an audio header that stores information about a telephone call; and
   b. an audio file that stores compressed digital audio data for the telephone call.

This embodiment of the present invention also includes a search engine which, upon decoding appropriate signaling information for a telephone call, initiates a real-time reverse-lookup that accesses publicly accessible directories and business information.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 5 is a mixed schematic and block diagram for an alternative embodiment of the multichannel interface circuit depicted in FIG. 2 that receives audio communication signals from a digital hybrid telephone T1 line and generates digital audio data for transmission to the PC.

DETAILED DESCRIPTION

Figure 1:
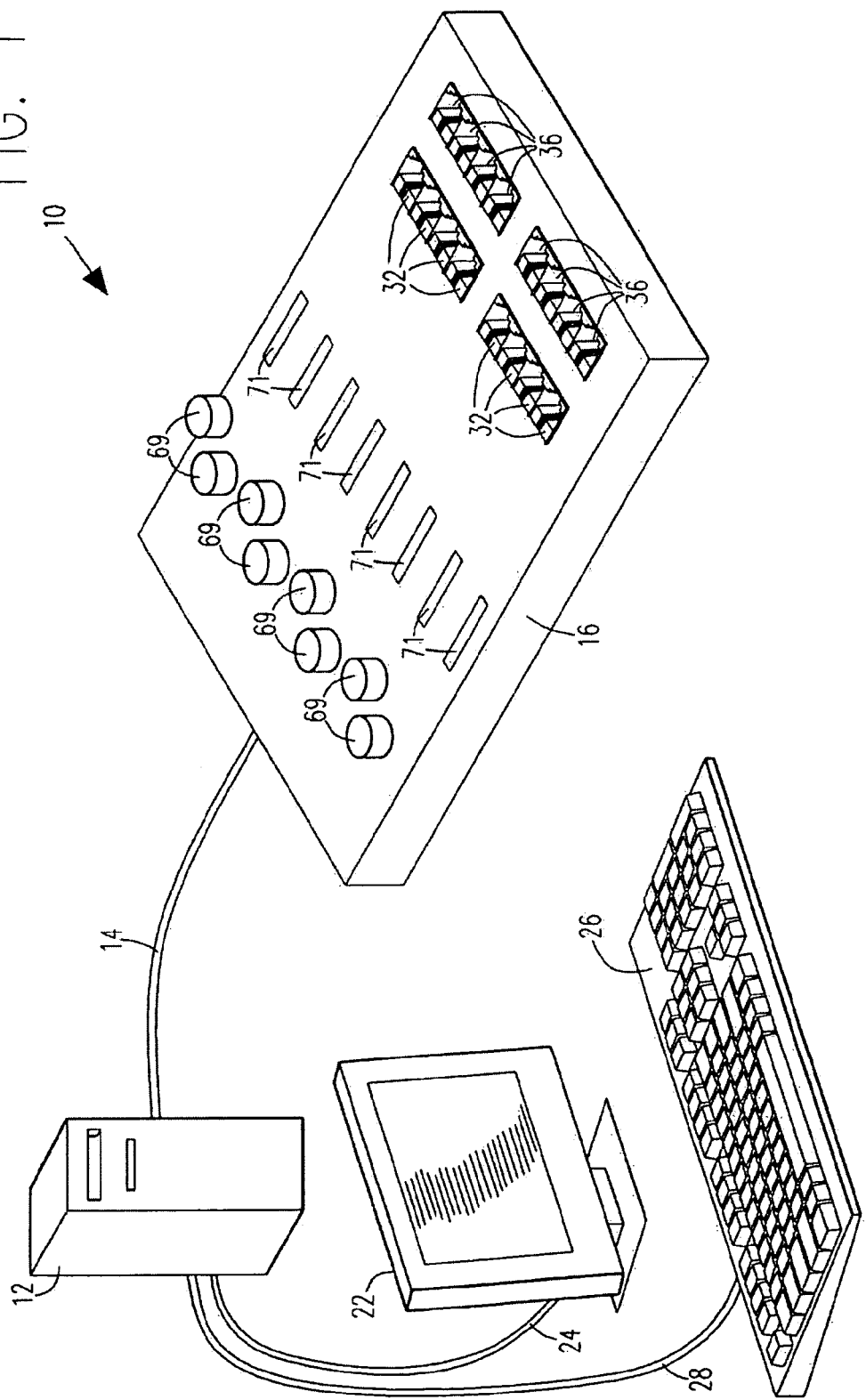
FIG. 1 is a perspective diagram illustrating a digital logger system of the present invention that includes a PC and an eight (8) channel signal processor in accordance with a preferred embodiment of the present invention, and that also usually includes both a display and a keyboard.

The perspective diagram of FIG. 1 depicts a digital logger system in accordance with the present invention referred to by the general reference character 10. The digital logger system 10 includes a PC 12 having a USB root hub, not depicted in any of the FIGs, to which a USB cable 14 connects an eight (8) channel signal processor 16. In most instances, the digital logger system 10 also includes both a display 22 connected to the PC 12 by a display cable 24, and a keyboard 26 connected to the PC 12 by a keyboard cable 28. Although the USB cable 14 may supply electrical power for energizing the operation of some devices connected to the PC 12 thereby, a preferred embodiment of the signal processor 16 also includes an external 5 volt power supply that is not illustrated in any of the FIGs. Other items not illustrated in FIG. 1 which may also be included in the digital logger system 10 are a mouse, track ball or joy stick, and also audio speakers for listening to communications recorded by the digital logger system 10.

In a presently preferred embodiment, the signal processor 16 includes eight (8) outside-analog-trunk receptacles 32. The outside-analog-trunk receptacles 32 are adapted to receive plugs of individual telephone cables that connect the signal processor 16 to analog telephone trunk lines. This embodiment of the signal processor 16 also includes eight (8) telephone receptacles 36. The telephone receptacles 36 are adapted to receive plugs of individual telephone cables that connect the signal processor 16 either to a handset, to a PBX, or to a telephone. For this particular embodiment of the signal processor 16, the outside-analog-trunk receptacles 32 and the telephone receptacles 36 are adapted to receive a type RJ12 plug.

Figure 2:
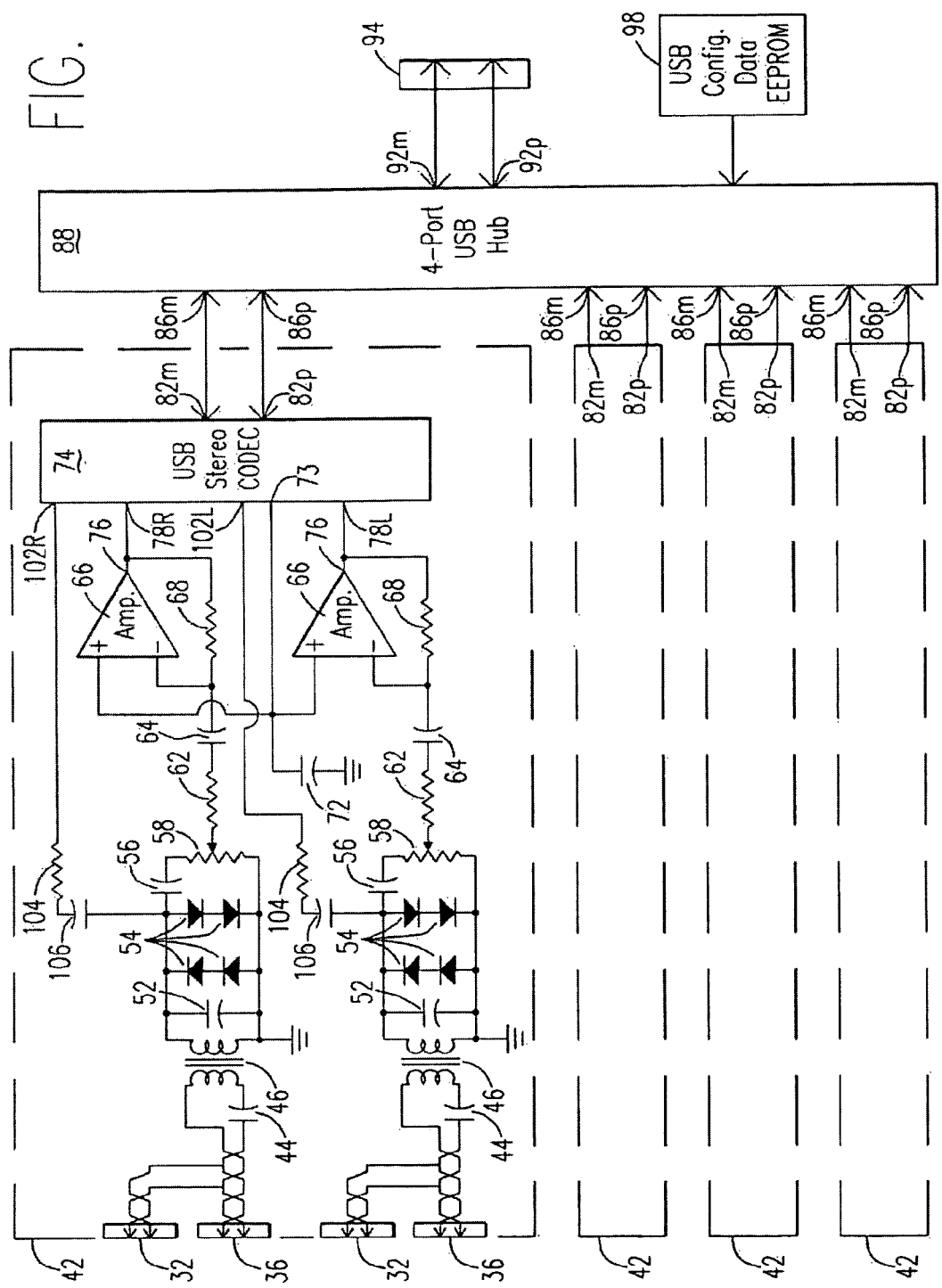
FIG. 2 is a mixed schematic and block diagram for the eight (8) channel multichannel interface circuit, included in the signal processor depicted in FIG. 1, that receives analog audio communication signals from telephone trunk lines and generates digital audio data for transmission to the PC.

As illustrated in FIG. 2, within the signal processor 16 each of the outside-analog-trunk receptacles 32 connects to one of the telephone receptacles 36. In this way the signal processor 16 couples analog audio communication signals between each telephone trunk line, i.e. through one outside-analog-trunk receptacle 32 and the telephone receptacle 36 connected thereto, and a handset, a PBX, or a telephone.

The signal processor 16 includes four (4) identical multichannel interface circuits 42, each of which is respectively enclosed within a dashed line in the illustration of FIG. 2. Each multichannel interface circuit 42 equips the signal processor 16 with a pair of simple line interfaces. Each line interface respectively receives and electronically conditions an analog audio communication signal from one of the outside-analog-trunk receptacles 32. Each line interface includes a series connected capacitor 44 and first winding of a transformer 46 that are connected in series across the outside-analog-trunk receptacle 32. A second winding of the transformer 46 connects to a surge protection circuit which includes a capacitor 52 that connects across the second winding to circuit ground in parallel with two oppositely oriented, series connected, pairs of 1N4007 diodes 54. The capacitively coupled transformer 46 and the surge protection circuit provides AC line coupling which is compatible with both "wet" and "dry" telephone trunk lines. This configuration for the transformer 46 and the surge protection circuit allows each multichannel interface circuit 42 to continuously and passively monitor a pair of telephone trunk lines without "going off hook," i.e. without presenting low impedance to either telephone trunk line connected respectively to the outside-analog-trunk receptacles 32.

Furthermore, the transformer 46 and capacitor 44 provide bi-directional coupling which enables the multichannel interface circuit 42 to independently inject audio signals back into each of the telephone trunk lines without "going off hook." The ability to inject an audio signal back into a trunk line permits automatically presenting a caller with audible announcements such as "this call may be monitored or recorded for quality assurance."

Those skilled in the art will appreciate that an audio signal may also be received from each outside-analog-trunk receptacle 32 into the multichannel interface circuit 42 using a high-impedance operational amplifier instead of the transformer 46. However, use of a high-impedance operational amplifier provides only unidirectional coupling of an analog signal from a telephone trunk line, and therefore prevents injecting an audio signal back into the line as described above.

In addition to the surge protection circuit, each channel of the multichannel interface circuit 42 includes a series connected capacitor 56 and potentiometer 58 also connected across the second winding of the transformer 46. A series connected resistor 62 and capacitor 64 couple an analog signal from an adjustable center terminal of the potentiometer 58 to an inverting input terminal of an amplifier 66. The amplifier 66 is preferably a model MC34072 manufactured by Motorola, Inc. or by Unisonic Technologies Co., Ltd. A gain control feedback resistor 68 also connects between the inverting input terminal of the amplifier 66 and an output terminal of the amplifier 66. The strength of the analog audio signal supplied from each potentiometer 58 to the amplifier 66 may be adjusted by rotating a control knob 69, depicted in FIG. 1, that is coupled to the potentiometer 58. A label 71, adjacent to each control knob 69, identifies the channel for which the control knob 69 adjusts the analog audio signal's strength.

A non-inverting input terminal of each amplifier 66 is coupled through a capacitor 72 to circuit ground, and connects directly to a VCCM terminal 73 of a model PCM2904DB "Stereo Analog CODEC With USB Interface" 74 that is manufactured by Texas Instruments Incorporated. The preferred embodiment of the signal processor 16 uses this lower-cost, linear Pulse Code Modulation ("PCM") model PCM2904DB stereo CODEC 74 instead of a more expensive logarithmic telecom CODEC such as that disclosed in the '239 patent. Use of such a commercial, off-the-shelf CODEC significantly betters the cost-effectiveness of the signal processor 16 in comparison with a digital logger of the type disclosed in the '239 patent. An output terminal 76 of the pair of amplifiers 66 in each multichannel interface circuit 42 connects respectively either to an ADC analog input for a R-channel $V_{IN}R$ terminal 78R or a L-channel $V_{IN}L$ terminal 78L of the stereo CODEC 74. As illustrated in FIG. 2, the single stereo CODEC 74 included in each multichannel interface circuit 42 simultaneously converts two monaural channels of audio communication signals respectively received through each of the outside-analog-trunk receptacles 32 into digital audio data while preserving adequate separation in that data between the two analog signals.

The stereo CODEC 74 transmits from its USB differential input/output minus terminal 82*m* and its USB differential plus terminal 82*p* audio data digitized from the two channels of audio signals received by the outside-analog-trunk receptacles 32 included in each multichannel interface circuit 42. The pair of differential signals transmitted from the input/output terminals 82*m* and 82*p* of the stereo CODEC 74 included in each four (4) multichannel interface circuit 42 are respectively supplied to pairs of USB upstream differential minus and plus data terminals 86*m* and 86*p* of a TUSB2046BFV 4-port USB hub 88 that is manufactured by Texas Instruments Incorporated. Root port USB downstream differential minus and plus data terminals 92*m* and 92*p* of the USB hub 88 are coupled to the USB cable 14 via a USB "B" receptacle 94. Also connected to the USB hub 88 is a USB configuration data EEPROM 98 which stores a vendor ID ("VID") and a product ID ("PID") for the signal processor 16. Use of the USB hub 88 is vital to the digital logger system 10 because it establishes within the digital logger system 10 a USB "Composite Device" that reduces the cost of the digital logger system 10, and allows all four (4) multichannel interface circuits 42 together with the USB hub 88 to be assembled on a single printed circuit board (PCB) using proper mixed-signal design rules.

As depicted in FIG. 2, analog outputs for right channel 102R and for left channel 102L of the stereo CODEC 74 of each multichannel interface circuit 42 are respectively coupled by a series connected resistor 104 and capacitor 106 to the second windings of each transformer 46 thereof. Digital audio data appropriately supplied to the stereo CODEC 74 via the USB hub 88 produces an analog output signal that is coupled through the transformer 46 to the outside-analog-trunk receptacle 32 thereby permitting the signal processor 16 to transmit audible announcements to callers.

Figure 3:
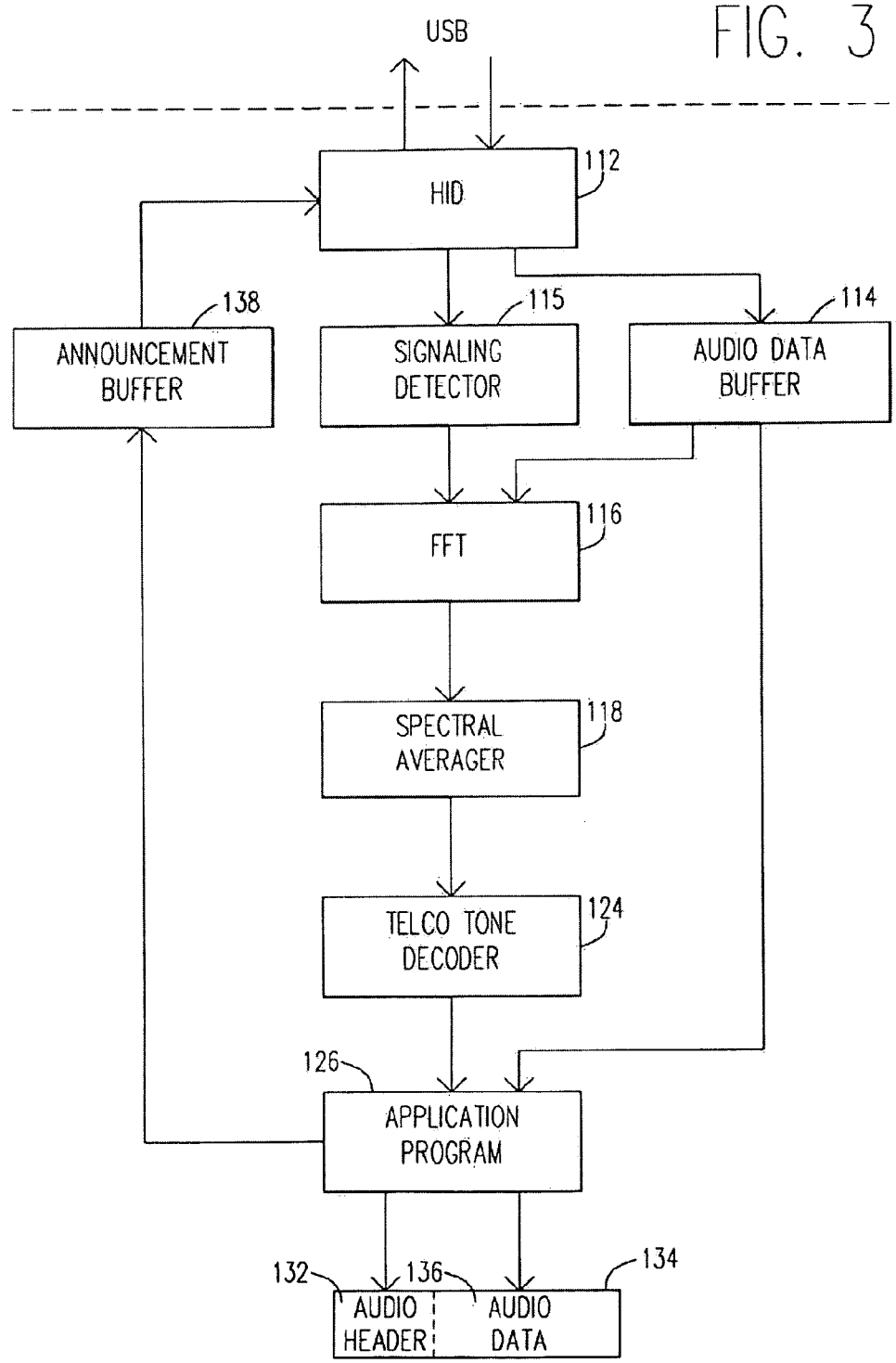
FIG. 3 is a flow diagram depicting processing performed on digital audio data received from the eight (8) channel signal processor by software executed by the PC.

Texas Instruments model PCM2904DB stereo CODECs 74 are preferred for the multichannel interface circuit 42 because they comply with the "Human Interface Driver" ("HID") specification. For computers running either LINUX or particular Microsoft operating systems such as Windows 98 and 2000, the HID standard specifies a software interface which permits an application computer program running in the PC 12 to communicate with the signal processor 16 via the USB cable 14. Consequently, a combination of the preferred stereo CODECs 74, the USB hub 88, the USB cable 14 and an operating system running in the PC 12 which provides HID functionality avoids both any need to write a device driver specifically for the signal processor 16, and the installation of special device driver software in the PC 12 of every digital logger system 10. Instead, application software exchanges data between the digital logger system 10 and the signal processor 16 using the operating system's native HID 112 illustrated in FIG. 3.

In general, HID-class devices include those controlled by humans for operating a computer system. Typical examples of HID-class devices that can communicate with a PC via a USB in conjunction with the HID 112 include keyboards, mice, trackballs, joysticks, disk drives, printers, and scanners. The HID 112 is general, and primarily handles the USB functionality of the device and generic HID functionality. The HID-class specification is the product of a working group sponsored by the USB Implementers Forum (www.usb.org).

When a device is plugged into the USB or when a host PC is turned on with a device attached to the USB, an operating system that includes a HID 112 running in the PC retrieves a series of descriptors from each USB device during a process called enumeration. After enumeration, the HID 112 provides an interrupt pipe for the device to send data packets, and the HID 112 opens the pipe to the interrupt endpoint and starts polling. The HID 112 is also responsible for managing the device through the default control pipe. HID devices dynamically describe their packets and other parameters through a HID report descriptor. The HID parser is a miscellaneous module that parses the HID report descriptor and creates a database of information about the device.

Major features and limitations of a HID 112 are:
1. a full-speed HID 112 can transfer up to 64,000 bytes per second (64 bytes in each 1 ms frame);
2. a HID 112 can request that the PC poll the device periodically to find out if the device has data to send; and
3. all data exchanged by a HID 112 resides in defined data structures called reports.

A single report can contain up to 65,535 bytes. The device's firmware must include a report descriptor that describes the data being exchanged. The report format for a HID 112 is flexible enough to handle almost any type of data.

Due to its generality, a HID 112 may also be used in conjunction with the USB for communicating with devices such as the signal processor 16, that do not really involve a human interface, but which exhibit communication requirements similar to those of human interface devices. The HID 112 handles any such device (actually the interface with such a device) that claims to comply with the HID specification.
Description of Software A computer program executed by the PC 12 is also vital to the digital logger system 10. Ever increasing computational capabilities of PCs presently enables a single PC to receive multiple channels of digital audio data via its USB while software running on the PC concurrently:
1. decodes communication signals embedded in digital audio data received from the signal processor 16;
2. compresses the digital audio data; and
3. stores the compressed digital audio data onto a recording device such as a hard disk.

Appendix I provides a source code program listing for computer programs included in an implementation of the present invention. The computer program is written in the C++ programming language that is well-known to those skilled in the art. The program has been executed on a Dell P4 PC. It is readily apparent to those skilled in the art that various other programming languages and/or digital computers could be used for alternative, equivalent implementations of the invention.

For Microsoft's Windows operating systems, a low-level software interface connects to audio primitives of the HID 112. For the LINUX operating system, the low-level interface ports to the HID 112 through a block-and-character driver. Packets of digital audio data for each of the eight channels received from the signal processor 16 are stored in local system memory and passed to the higher level portions of the application program using individual ring buffers included in audio data buffers 114. The ring buffers of the audio data buffers 114 cache the audio data stream during periods in which the operating system is occupied with higher priority tasks, and therefore is unable to allocate adequate resources to process digital audio data in real-time.

A signaling detector 115 also receives packets of digital audio data for each of the eight channels of digital audio data received from the signal processor 16. Whenever in checking packets of digital audio data the signaling detector 115 determines that a signaling event is occurring, it transmits a control signal to a fast fourier transform ("FFT") routine 116 which activates the FFT routine 116 for processing packets of digital audio data.

Whenever processing resources of the PC 12 become available, the FFT routine 116 performs a Discrete Fourier Transform ("DFT") on packets of incoming audio digital audio data both individually and in small groups. The FFT routine 116 passes the spectrum versus time matrix which it produces to a spectral averager 118.

For each channel of digital audio data received from the signal processor 16, the spectral averager 118 accumulates spectral data received from the FFT routine 116 to detect spectral peaks which exceed preset threshold values. The spectral values are stored in tables and vary significantly depending on the period of the incoming signaling. When peaks in the spectral data exceed threshold values corresponding to an anticipated spectral distribution of incoming signaling, the spectral averager 118 increments a counter which accumulates data for the channel on which the peak occurred. Periodically, these counters are decremented or zeroed. Detection of a signaling event occurs, e.g. "going off hook," dial tone, ringing, a particular touch-tone key is being pressed, etc., when values in counters exceed specified thresholds.

As described previously, the signal processor 16 supplies digital audio data continuously for each of its eight (8) channels even when no telephone call is occurring. To record digital audio data only during a telephone call, a telco tone decode routine 124 processes output from the spectral averager 118 to detect and decode various different types telephone signaling such as ringing, Dual-Tone Multifrequency ("DTMF") signaling, Automatic Number Identification ("ANI") also known as Caller-ID ("CID"), or Automatic Location Identification ("ALI"). The decode routine 124 also includes a deserializer, which operates analogous to a hardware shift-register, for converting a serialized stream of decoded telephone signals into parallel bytes for further processing by an application program 126. In addition, the deserializer also performs parity detection and correction when ANI/CID or ALI signaling occurs.

The application program 126 includes an audio header composer which receives telephone signaling data decoded by the decode routine 124. Information about each telephone call is stored in an audio header portion 132 at the beginning of an audio file 134. Data stored in the audio header portion 132 include the channel of the signal processor 16 from which the data was recorded; the date, time and time zone of the recording; the name assigned to the PC 12; the model and serial numbers of the signal processor 16 and the type of stereo CODEC 74 included in the signal processor 16; whether data in the audio file 134 has been analyzed for DTMF or CID signaling; the direction of the telephone call either incoming or outgoing; and the telephone number specified by DTMF or CID signaling. The audio header portion 132 makes each recorded telephone call a self-contained repository both for the recorded digital audio data, and for the information about the calling party which was obtained while recording the digital audio data.

The application program 126 also stores digital audio data for each recorded telephone call, compressed as described in the '239 patent, into an audio data portion 136 of a separate, time-stamped audio file 134. Pointers to various locations within each ring buffer in the audio data buffers 114 ensure temporal synchronization between the arrival at the application program 126 of parallel bytes of decoded telephone signals extracted from the digital audio data of a particular channel by the decode routine 124 and compression of that channel's digital audio data by the application program 126. However, since the a model PCM2904DB stereo CODEC 74 produces linear PCM digital audio data rather than μLaw compressed digital audio data such as that produced by more expensive telecom CODECS, before performing software compression using table lookup the application program 126 of the present invention first converts the linear PCM digital audio data into μLaw compressed digital audio data. The '239 patent is hereby incorporated by reference as though fully set forth here.

When a telephone line initially "goes off hook," the application program 126 allocates a "temporary" header array in RAM which stores as much information as is initially available when the call commences. This header array contains sufficient information that an audio playback program can reproduce compressed digital audio data even though the telephone call is incomplete. Thereafter, the application program 126 opens the audio file 134 for recording both the audio header portion 132 and the audio data portion 136. In opening the audio file 134, the application program 126 stores the "temporary" header at the beginning of the audio file 134. A pointer at the beginning of the audio header portion 132 specifies where the audio data portion 136 begins in the audio file 134. Thereafter, as the application program 126 prepares compressed digital audio data it is written into the audio data portion 136 of the audio file 134. Writing the compressed digital audio data into the audio data portion 136 immediately permits reproducing the telephone call in "real time" while it is being logged. While compressed digital audio data is being recorded into the audio data portion 136, gradually over time the application program 126 updates the audio header portion 132 with the DTMF data, CID and other information. After the call is completed, the application program 126 stores the last of the information, e.g. call length, etc., into the audio header portion 132. Thus at the end of each telephone call, the single audio file 134 contains a complete audio header portion 132 and all the compressed digital audio data in the audio data portion 136 for a single telephone call.

When appropriate for transmitting an audible announcement to a caller, the application program 126 also transmits digital audio data to announcement buffers 138 for transmission via the HID 112 to the appropriate stereo CODEC 74 in the signal processor 16. For example, following ring detection and a telephone line "going off hook," the application program 126 might transmit digital audio data to the announcement buffers 138 which, via a specified channel of the signal processor 16, presents the caller with an audible announcement such as "this call may be monitored or recorded for quality assurance."

Figure 4:
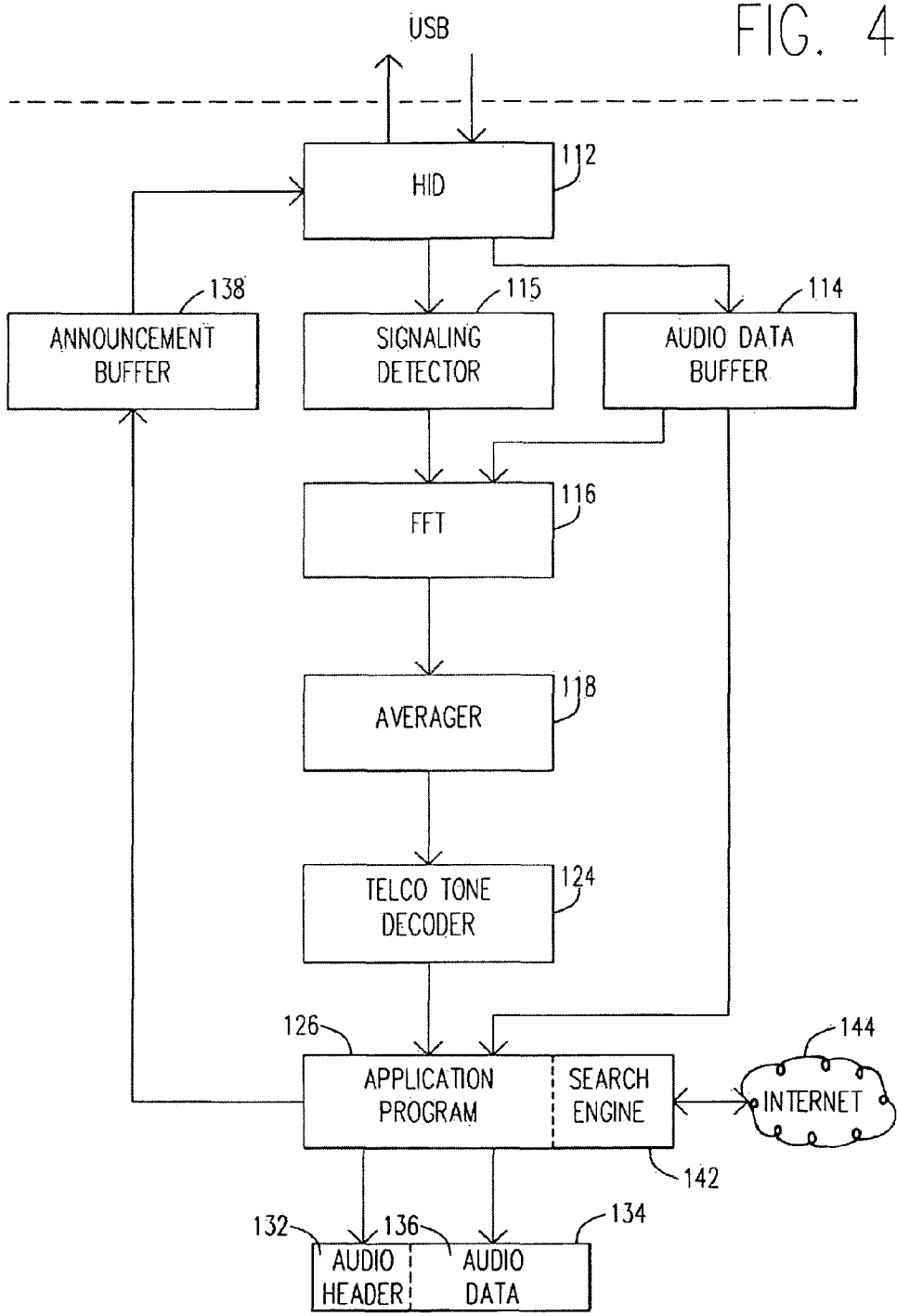
FIG. 4 is an alternative embodiment of the flow diagram of FIG. 3 which further includes a search engine that autonomously searches Internet Web sites in real-time for information pertinent to audio data then being processed within the PC.

An alternative embodiment of the present invention illustrated in FIG. 4 augments the application program 126 with a search engine 142. When DTMF, CID or ALI signals occur, the application program 126 passes that data to the search engine 142 which initiates, via the Internet 144, a real-time reverse-lookup. Using the street address or caller's telephone number, the search engine 142 issues Internet Hypertext Transfer Protocol ("HTTP") requests to search publicly accessible Internet directories for business data. If the search engine 142 receives a CID telephone number, the address and name of the calling party may be determined via a reverse-lookup of the number in published directories. In addition, the telephone number is matched against search-engine responses, and these responses are traced to generate business information, such as the Standard Industrial Codes ("SIC") and other general information about the caller. The search engine 142 then passes the information obtained from these searches to the audio header composer of the application program 126 for storage in the audio header portion 132.

A higher level user-interface, not illustrated in any of the FIGs., may then allow the user to quickly index audio files 134 based on information stored in audio header portions 132. This information is searchable and reports can be generated using information stored about selected calls. For example, it becomes easy to generate a list of calls which have originated from IBM Corporation, since the main IBM telephone number appears in the CID stream, and the search engine 142 uses that number to reverse-index an address. Another example is the ability to locate calls originating from a particular street address, if that address is accessible via the Internet 144 along with the related telephone number. It is readily apparent that the usefulness of the search engine 142 in obtaining information from callers which have blocked CID is limited, but a significant amount of business information may be accessed via the Internet 144 for businesses which do not have publicly listed telephone numbers. This information can then be used to index and sort audio files 134 which might otherwise be of limited use.

If information obtained by the search engine 142 is to be provided in real-time to someone who is answering a telephone call, then in addition to storage in the audio header portion 132, the information must be communicated via a network to a workstation that is visible to the person answering the telephone call.

While the accuracy currently available with speech-to-text software is limited, eventually it should be possible to generate audio file headers which contain a text which accurately presents the spoken words in audio files 134. This capability has been demonstrated using the publicly available SPHYNX software. Presently, the accuracy of the speech-to-text is limited by the available processing power of the PC 12. As processing power of PCs 12 increase, it is apparent that accuracy will increase and true "speaker independent" voice recognition with larger vocabularies will become practical.

Although the present invention has been described in terms of the presently preferred embodiment, it is to be understood that such disclosure is purely illustrative and is not to be interpreted as limiting. For example, if audio communication signals are supplied to the signal processor 16 via a T1 line, then as illustrated in FIG. 5 preferably a Dallas Semiconductor DS3152 Framer 162 coupled to a Cypress Semiconductor E Z-USB FX2™ USB Microcontroller High-speed Peripheral Controller 164 by a bus 166 replace the stereo CODECs 74 and their associated components. Those elements of the alternative embodiment of the present invention depicted in FIG. 5 that are common to the multichannel interface circuit 42 illustrated in FIG. 2 carry the same reference numeral distinguished by a prime ("'") designation. For such a configuration of the multichannel interface circuit 42', the Framer 162 rather than the stereo CODEC 74 interfaces the T1 telephone line at the physical layer to thereby receive the audio communication signal directly from the transformer 46. The Peripheral Controller 164 exchanges digital audio data with the Framer 162 and provides a HID compatible interface between the Framer 162 and the USB hub 88'. Note that because the digital audio data received from the T1 telephone line by the Framer 162 has already undergone μLaw compression, when the multichannel interface circuit 42' connects to a T1 telephone line the application program 126' does not perform μLaw compression. Note also that the accuracy of speech-to-text conversion can be improved if the signal processor 16 is connected to a true-digital hybrid telephone line such as a T1 line.

Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A digital logger system adapted for receiving and recording audio telecommunication signals, the digital logger system comprising:
  a multichannel interface circuit for concurrently and continuously receiving digital audio telecommunication signals for at least two telephone calls from a digital hybrid telephone line, and for transmitting digital audio data extracted from the received digital audio telecommunication signals received via the digital hybrid telephone line, the multichannel interface circuit including:
  a. a line interface for electronically conditioning digital audio telecommunication signals received from the digital hybrid telephone line;
  b. a framer which receives the conditioned digital audio telecommunication signals from the line interface, interfaces the physical layer of digital hybrid telephone line signals received from the line interface, and transmits digital audio data extracted from the received digital audio telecommunication signals; and c. a peripheral controller for exchanging digital audio data with the framer and with a Universal Serial Bus ("USB") hub;

a USB hub for receiving the digital audio data transmitted from the peripheral controller, and for transmitting the digital audio data to a USB root hub; and a personal computer ("PC") having a USB root hub that is coupled to the USB hub, and which PC:

receives the digital audio data transmitted from the USB hub; and executes software that continuously monitors the received digital audio data for:

decoding line status and signaling information embedded in digital audio data to determine status of a telephone line including a telephone line "going off hook;" and upon detecting a telephone line "going off hook," recording both:

an audio header that stores information about a telephone call; and an audio file that stores compressed digital audio data for the telephone call.

2. The digital logger system of claim 1 wherein software executed by the PC includes a search engine which upon detecting Dual-Tone Multifrequency ("DTMF") signaling for a telephone call initiates a real-time reverse-lookup which accesses publicly accessible directories and business information.

3. The digital logger system of claim 1 wherein software executed by the PC includes a search engine which upon detecting Automatic Number Identification ("ANI") {also known as Caller ID ("CID")} for a telephone call initiates a real-time reverse-lookup which accesses publicly accessible directories and business information.

4. The digital logger system of claim 1 wherein software executed by the PC includes a search engine which upon detecting Automatic Location Identification ("ALI") for a telephone call initiates a real-time reverse-lookup which accesses publicly accessible directories and business information.

5. The digital logger system of claim 1 wherein upon detecting a telephone line "going off hook," software executed by the PC transmits digital audio data to the multichannel interface circuit which causes the multichannel interface circuit to transmit an audible announcement to a caller via that telephone line.

6. A signal processor adapted for use with a PC that includes a USB root hub, and that executes PC software for continuously monitoring digital audio data received via the USB root hub, the PC software:

decoding line status and signaling information embedded in digital audio data to determine status of a telephone line including a telephone line "going off hook;" and upon detecting a telephone line "going off hook," recording both:

an audio header that stores information about a telephone call; and an audio file that stores compressed digital audio data for the telephone call;

the signal processor comprising:

a. a multichannel interface circuit for concurrently and continuously receiving digital audio telecommunication signals for at least two telephone calls from a digital hybrid telephone line, and for transmitting digital audio data extracted from the received digital audio telecommunication signals received via the digital hybrid telephone line, the multichannel interface circuit including:

i. a line interface for electronically conditioning digital audio telecommunication signals received from the digital hybrid telephone line;

ii. a framer which receives the conditioned digital audio telecommunication signals from the line interface, interfaces the physical layer of digital hybrid telephone line signals received from the line interface, and transmits digital audio data extracted from the received digital audio telecom- munication signals; and iii. a peripheral controller for exchanging digital audio data with the framer and with a USB hub, and b. a USB hub for receiving the digital audio data transmitted from the peripheral controller, and for transmitting the digital audio data to the USB root hub of the PC.

7. A digital logger system adapted for receiving and recording audio telecommunication signals, the digital logger system comprising:

a multichannel interface circuit for concurrently and continuously receiving digital audio telecommunication signals for at least two telephone calls from a digital hybrid telephone line, and for transmitting digital audio data extracted from the received digital audio telecommunication signals received via the digital hybrid telephone line, the multichannel interface circuit including:

a. a line interface for electronically conditioning digital audio telecommunication signals received from the digital hybrid telephone line;

b. a framer which receives the conditioned digital audio telecommunication signals from the line interface, interfaces the physical layer of digital hybrid telephone line signals received from the line interface, and transmits digital audio data extracted from the received digital audio telecommunication signals; and c. a peripheral controller for exchanging digital audio data with the framer and with a USB hub;

a USB hub for receiving the digital audio data transmitted from the peripheral controller, and for transmitting the digital audio data to a USB root hub; and a PC having a USB root hub that is coupled to the USB hub, and which PC:

receives the digital audio data transmitted from the USB hub; and executes software that when a telephone line goes "off hook," records both:

an audio header that stores information about a telephone call; and an audio file that stores compressed digital audio data for the telephone call.

8. The digital logger system of claim 7 wherein software executed by the PC includes a search engine which upon detecting DTMF signaling for a telephone call initiates a real-time reverse-lookup which accesses publicly accessible directories and business information.

9. The digital logger system of claim 7 wherein software executed by the PC includes a search engine which upon detecting ANI {also known as CID} for a telephone call initiates a real-time reverse-lookup which accesses publicly accessible directories and business information.

10. The digital logger system of claim 7 wherein software executed by the PC includes a search engine which upon detecting ALI for a telephone call initiates a real-time reverse-lookup which accesses publicly accessible directories and business information.

11. The digital logger system of claim 7 wherein upon detecting a telephone line "going off hook," software executed by the PC transmits digital audio data to the multichannel interface circuit which causes the multichannel interface circuit to transmit an audible announcement to a caller via that telephone line.

12. A signal processor adapted for use with a PC that includes a USB root hub, and that executes PC software for monitoring digital audio data received via the USB root hub, the PC software:

upon detecting a telephone line "going off hook," recording both:
an audio header that stores information about a telephone call; and
an audio file that stores compressed digital audio data for the telephone call;

the signal processor comprising:

a. a multichannel interface circuit for concurrently and continuously receiving digital audio telecommunication signals for at least two telephone calls from a digital hybrid telephone line, and for transmitting digital audio data extracted from the received digital audio telecommu- nication signals received via the digital hybrid tele- phone line, the multichannel interface circuit including:

i. a line interface for electronically conditioning digital audio telecommunication signals received from the digital hybrid telephone line;

ii. a framer which receives the conditioned digital audio telecommunication signals from the line interface, interfaces the physical layer of digital hybrid telephone line signals received from the line interface, and transmits digital audio data extracted from the received digital audio telecom- munication signals; and iii. a peripheral controller for exchanging digital audio data with the framer and with a USB hub, and b. a USB hub for receiving the digital audio data transmitted from the peripheral controller, and for transmitting the digital audio data to the USB root hub of the PC.

* * * * *